United States Patent

Sasaki et al.

Patent Number: 5,097,022
Date of Patent: Mar. 17, 1992

[54] BISAZO PIGMENTS FOR USE IN ELECTROPHOTOGRAPHIC PHOTOCONDUCTORS

[75] Inventors: Masaomi Sasaki, Susono; Tomoyuki Shimada; Mitsuru Hashimoto, both of Numazu, all of Japan

[73] Assignee: Ricoh Company, Ltd., Tokyo, Japan

[21] Appl. No.: 431,233

[22] Filed: Nov. 3, 1989

[30] Foreign Application Priority Data

Nov. 14, 1988 [JP] Japan .................. 63-288546
Nov. 14, 1988 [JP] Japan .................. 63-288547

[51] Int. Cl.⁵ .................. C09B 35/03; C09B 35/10; G03G 5/06
[52] U.S. Cl. .................. 534/759; 534/561; 534/565; 534/691; 430/58; 430/79
[58] Field of Search .................. 430/72, 58, 76, 78; 534/691, 759

[56] References Cited

U.S. PATENT DOCUMENTS 4,349,616  9/1982  Sasaki, I .................. 534/691 X
4,486,519 12/1984  Sasaki, II .................. 534/759 X

FOREIGN PATENT DOCUMENTS 59-72448   4/1984  Japan .................. 534/691
62-267363 11/1987  Japan .................. 534/691
64-63970   3/1989  Japan .................. 534/691
64-79753   3/1989  Japan .................. 534/691

*Primary Examiner*—David B. Springer
*Assistant Examiner*—Fiona T. Powers
*Attorney, Agent, or Firm*—Oblon, Spivak, McClelland, Maier & Neustadt

[57] ABSTRACT

An electrophotographic photoconductor comprises an electroconductive support and a photoconductive layer formed thereon comprising a bisazo compound having the formula (I) serving as a charge generating material:

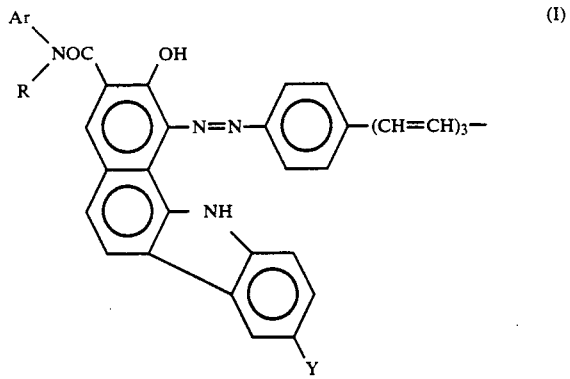
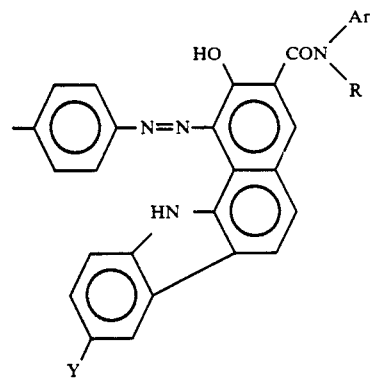

wherein Y represents a halogen, an alkyl group which may have a substituent, an alkoxyl group, an acyl group, a substituted amino group, a cyano group or a nitro group; R represents hydrogen, or an alkyl group which may have a substituent; and Ar represents an aryl group which may have a substituent.

2 Claims, 6 Drawing Sheets

BISAZO PIGMENTS FOR USE IN ELECTROPHOTOGRAPHIC PHOTOCONDUCTORS

BACKGROUND OF THE INVENTION

1. Field of the Invention

The present invention relates to electrophotographic photoconductors, and more particularly to electrophotographic photoconductors comprising an electroconductive support and a photoconductive layer comprising a particular bisazo pigment as a charge generating material which generates charge carriers when exposed to light.

2. Discussion of Background

Conventionally, a variety of inorganic and organic electrophotographic photoconductors are known. As inorganic electrophotographic photoconductors, there are known, for instance, a selenium photoconductor, a selenium-alloy photoconductor, and a zinc oxide photoconductor which is prepared by sensitizing zinc oxide with a sensitizer pigment and dispersing the same in a binder resin. Furthermore, as a representative example of organic electrophotographic photoconductors, an electrophotographic photoconductor comprising a charge transporting complex of 2,4,7-trinitro-9-fluorenone and poly-N-vinylcarbazole is known.

However, while these electrophotographic photoconductors have many advantages over other conventional electrophotographic photoconductors, they have several shortcomings from the viewpoint of practical use.

For instance, a selenium photoconductor, which is widely used at present, has the shortcomings that its manufacturing conditions are so difficult that its production cost is high, and it is difficult to work it into the form of a belt due to its poor flexibility. Furthermore, it is so vulnerable to heat and mechanical shocks that it must be handled with the utmost care.

In contrast to this, the zinc oxide photoconductor is inexpensive since it can be produced more easily than the selenium photoconductor. More specifically, it can be produced by simply coating inexpensive zinc oxide particles on a support. However, it is poor in its photosensitivity, and mechanical characteristics such as surface smoothness, hardness, tensile strength and wear resistance. Therefore, it is not suitable for a photoconductor for use in plain paper copiers in which the photoconductor is used in quick repetition.

The photoconductor employing the aforementioned charge transporting complex of 2,4,7-trinitro-9-fluorenone and poly-N-vinylcarbazole is also poor in its photosensitivity and therefore not suitable for practical use, particularly for a high speed copying machine.

Recently, extensive studies have been done on the electrophotographic photoconductors in order to eliminate the above-mentioned shortcomings of the conventional photoconductors. In particular, attention has been focused on a multi-layered type organic electrophotographic photoconductor, each comprising an electroconductive support, a charge generation layer comprising an organic pigment formed on the electroconductive support, and a charge transport layer comprising a charge transporting material formed on the charge generation layer, which are for use in plain paper copiers, since such multi-layered type organic photoconductors have high photosensitivity and stable charging properties as compared with the conventional organic photoconductors. Several types of the multi-layered type organic electrophotographic photoconductors are being successfully used in practice. Examples of the multi-layered type organic electrophotographic photoconductors are as follows:

(1) A multi-layered type electrophotographic photoconductor whose charge generation layer is prepared by vacuum evaporation of a perylene derivative and whose charge transport layer comprises an oxadiazole derivative, disclosed in U.S. Pat. No. 3,871,882.

(2) A multi-layered type electrophotographic photoconductor whose charge generation layer is prepared by coating an organic amine solution of Chlorodiane Blue on an electroconductive support and whose charge transport layer comprises a hydrazone derivative, disclosed in Japanese Laid-Open Patent Application No. 55-42380.

(3) A multi-layered type electrophotographic photoconductor whose charge generation layer is prepared by coating on an electroconductive support an organic solvent in which distyrylbenzene-type bisazo pigment is dispersed and whose charge transport layer comprises a hydrazone compound, disclosed in Japanese Laid-Open Patent Application No. 55-84943.

As previously mentioned, these multi-layered type electrophotographic photoconductors have many advantages over other conventional photoconductors, but at the same time, they have various shortcomings.

Specifically, the electrophotographic photoconductor (1) employing a perylene derivative and an oxadiazole derivative produces no problem when used in an ordinary electrophotographic copying machine, but its photosensitivity is insufficient for use in a high-speed electrophotographic copying machine. In addition to the above, since the perylene derivative, which serves as a charge generating material to perform the function of controlling the spectral sensitivity of the photoconductor, does not necessarily have spectral absorbance in the entire visible light range, this photoconductor is not suitable for use in color copiers.

The electrophotographic photoconductor (2) employing Chlorodiane blue and a hydrazone compound exhibits comparatively good photosensitivity. However, to prepare this photoconductor, an organic amine, for example, ethylene diamine, which must be handled with the utmost care, is essential as a solvent for forming the charge generation layer.

The electrophotographic photoconductor (3) employing a distyryl benzene type bisazo compound and a hydrazone compound have an advantage over other conventional electrophotographic photoconductors in that the charge generation layer can be prepared easily by coating a dispersion of the bisazo pigment on an electroconductive support. However, its photosensitivity is too low to be used in a high-speed electrophotographic copying machine.

In addition to the above photoconductors, various electrophotographic photoconductors employing particular azo compounds, which are considered to effectively work as a charge generating material when used in a multi-layered type electrophotographic photoconductor, are proposed. For example, a benzidine-type bisazo compound is disclosed in Japanese Laid-Open Patent Applications 47-37543 and 52-55643; a stilbene-type bisazo compound is disclosed in Japanese Laid-Open Patent Application 52-8832; a diphenylhexatriene-type bisazo compound is disclosed in Japanese Laid-Open Patent Application 58-222152; and a diphenylbutadiene-type bisazo compound is disclosed in Japanese Laid-Open Patent Application 58-222153.

However, the multi-layered type electrophotographic photoconductors employing the above-mentioned conventional azo compounds do not satisfactorily function in the high-speed copying machine, since the photosensitivity thereof is poor.

Recently, there is a demand for an electrophotographic photoconductors for use in a laser printer, in particular, for photoconductors having high photosensitivity in a semiconductor laser wavelength region. The photosensitivity of the above-mentioned photoconductors are too low to be put to practical use for semiconductor laser.

The applicants of the present application have already proposed a diphenylhexatriene-type bisazo compound, which is disclosed in Japanese Laid-Open Patent Applications 58-222152 and 59-136351. As a result of further extensive studies, it is found that the photosensitivity of the above diphenylhexatriene-type bisazo compound is remarkably increased by introducing a substituent into a benzocarbazole ring of the compound at the 8-position, and then the present invention is attained. Although Japanese Laid-Open Patent Application 62-147463 describes the introduction of a substituent into the benzocarbazole ring, it does not refer to the diphenylhexatriene-type bisazo compound as an azo component.

SUMMARY OF THE INVENTION

Accordingly, a first object of the present invention is to provide an electrophotographic photoconductor, free from the above-mentioned conventional shortcomings, which has high photosensitivity and uniform spectral absorbance not only in the entire visible light range, but also in the semiconductor laser wavelength region, and which can be easily manufactured and is suitable for use in laser printers.

A second object of the present invention is to provide a charge generating material for use in the above-mentioned electrophotographic photoconductor.

A third object of the present invention is to provide novel bisazo compounds which works as charge generating materials in the electrophotographic photoconductor, in particular in the multi-layered type electrophotographic photoconductor for use in high-speed copying machines and laser printers.

The first object of the present invention can be achieved by an electrophotographic photoconductor comprising an electroconductive support and a photoconductive layer formed thereon comprising a bisazo compound having the formula (I) serving as a charge generating material:

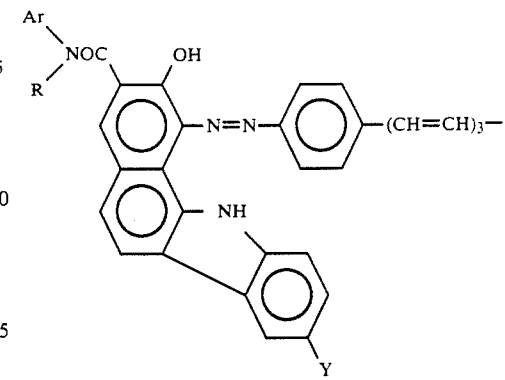

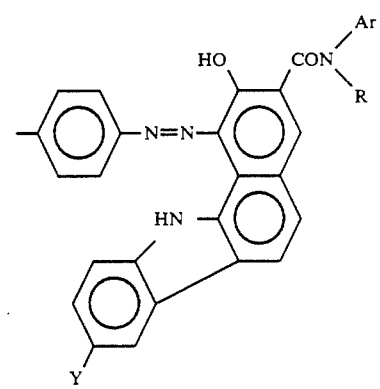

wherein Y represents a halogen, an alkyl group having 1 to 4 carbon atoms, which may have a substituent, an alkoxyl group having 1 to 4 carbon atoms, an acyl group having 1 to 4 carbon atoms, a substituted amino group, a cyano group or a nitro group; R represents hydrogen, or an alkyl group having 1 to 4 carbon atoms, which may have a substituent; and Ar represents an aryl group which may have a substituent.

The second object of the present invention can be achieved by a charge generating material for use in the electrophotographic photoconductor, which comprises a bisazo compound having formula (I):

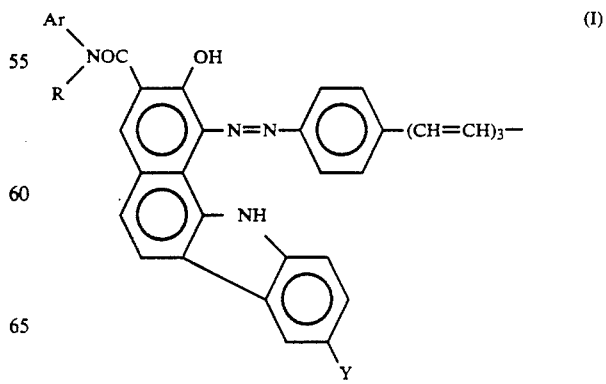

-continued

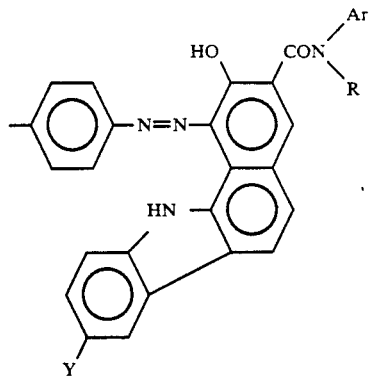

wherein Y represents a halogen, an alkyl group having 1 to 4 carbon atoms, which may have a substituent, an alkoxyl group having 1 to 4 carbon atoms, an acyl group having 1 to 4 carbon atoms, a substituted amino group, a cyano group or a nitro group; R represents hydrogen, or an alkyl group having 1 to 4 carbon atoms, which may have a substituent; and Ar represents an aryl group which may have a substituent.

The third object of the present invention can be achieved by a bisazo compound having formula (II):

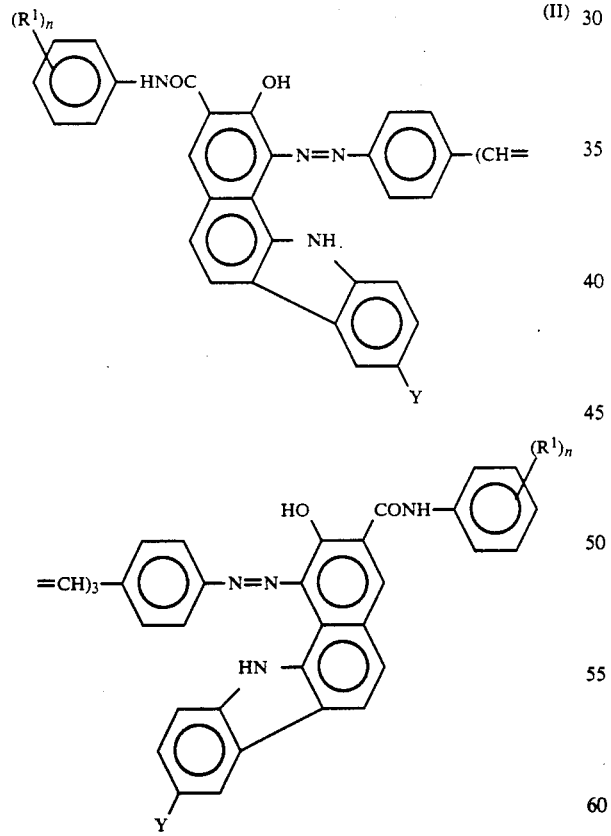

wherein Y represents a chlorine atom, a methyl group or a methoxy group; $R^1$ represents hydrogen, an alkyl group having 1 to 4 carbon atoms, an alkoxyl group having 1 to 4 carbon atoms, a halogen or a nitro group; and n is 1 or 2, and when n is 2, $R^1$ may be the same or different.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
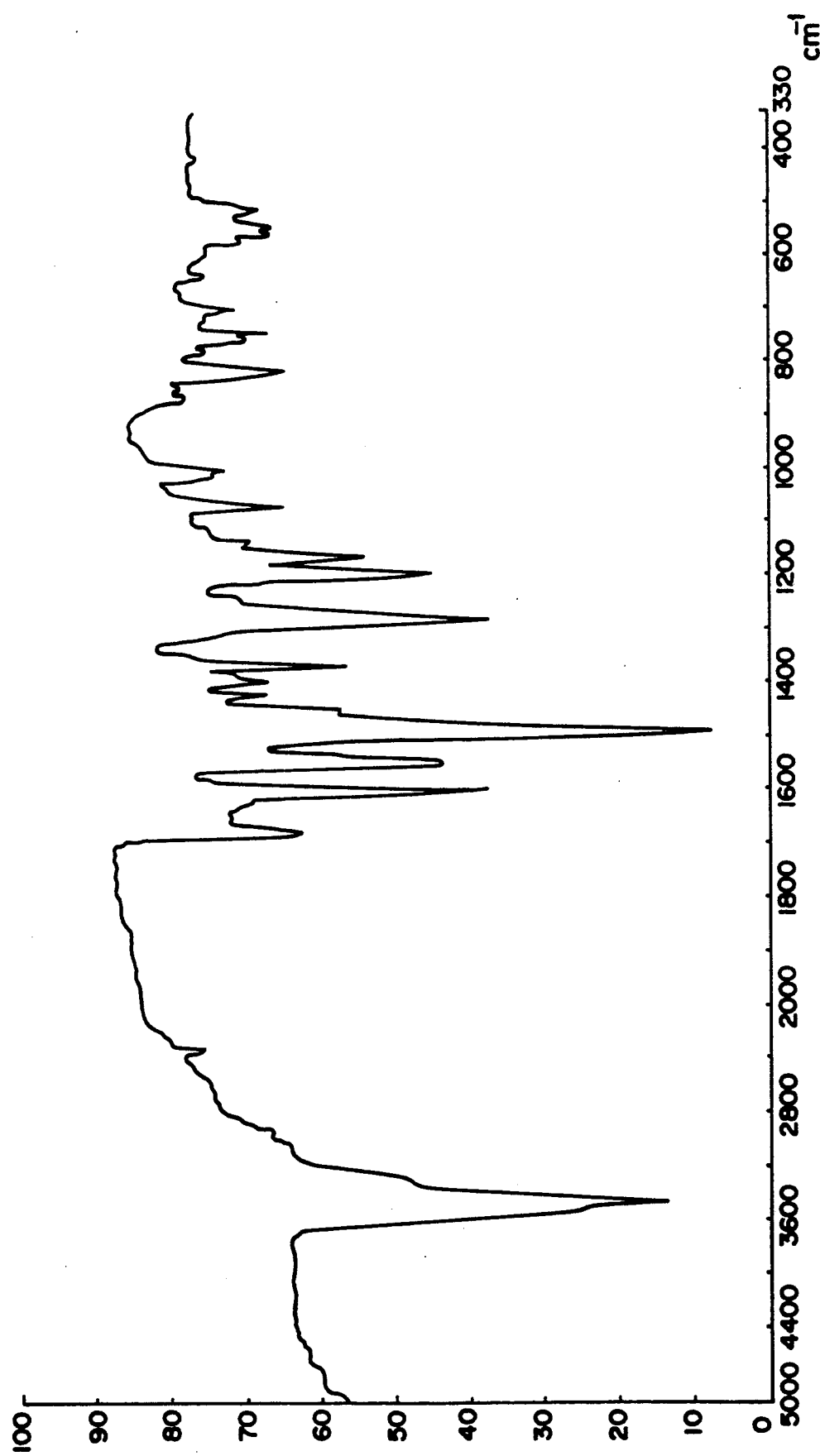
FIGS. 1 to 5 are IR spectra of bisazo compounds according to the present invention.
Figure 2:
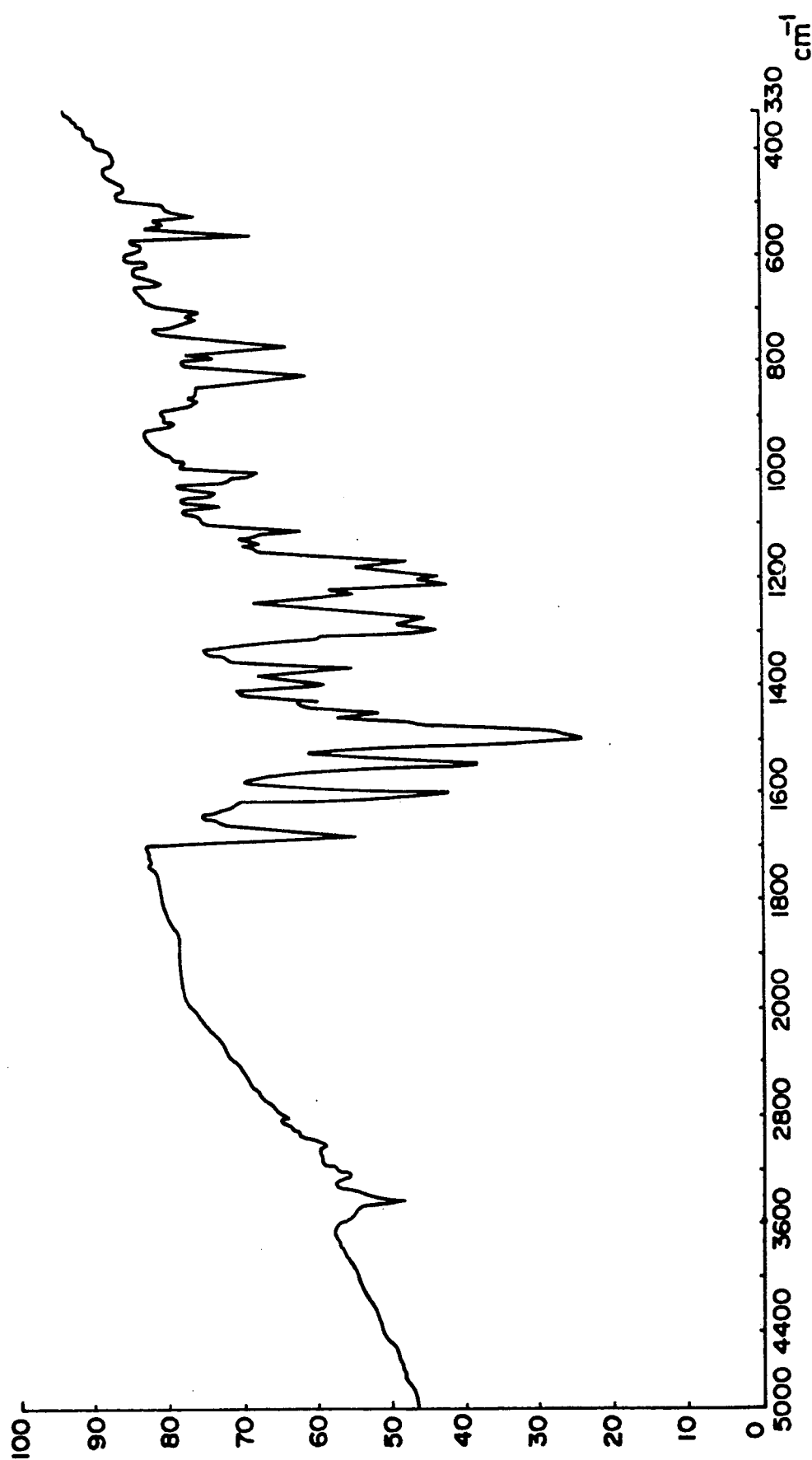
Figure 3:
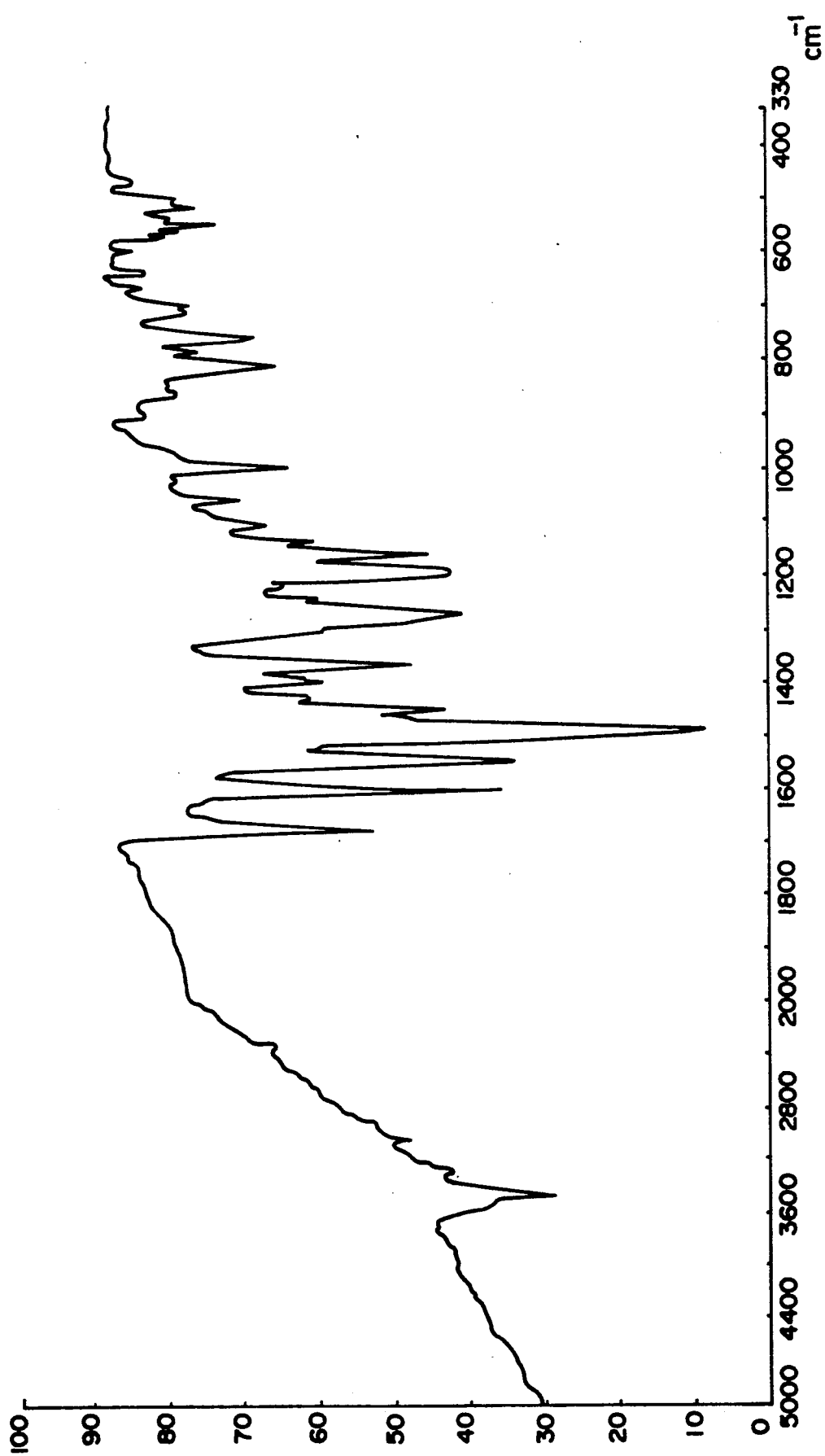
Figure 4:
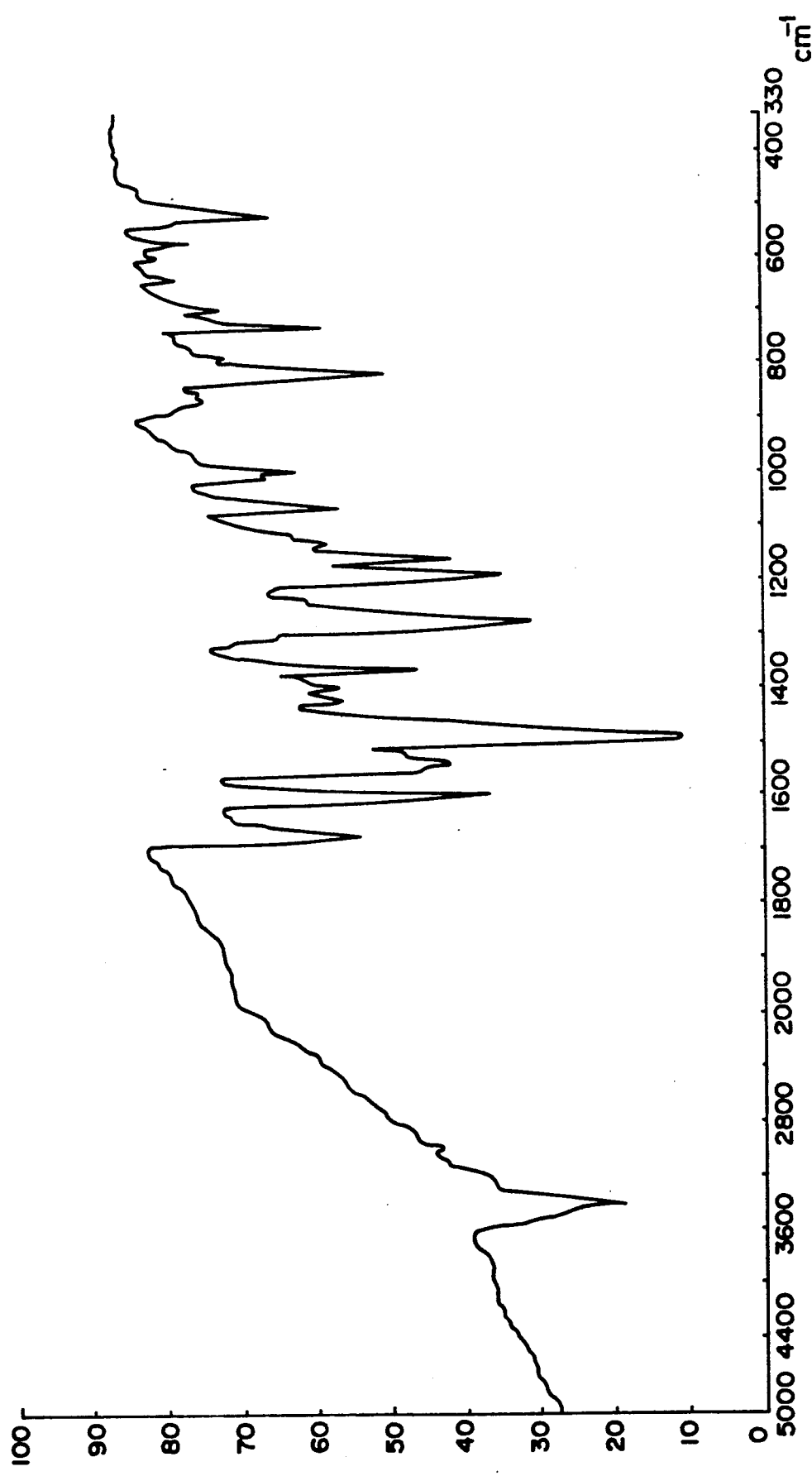
Figure 5:
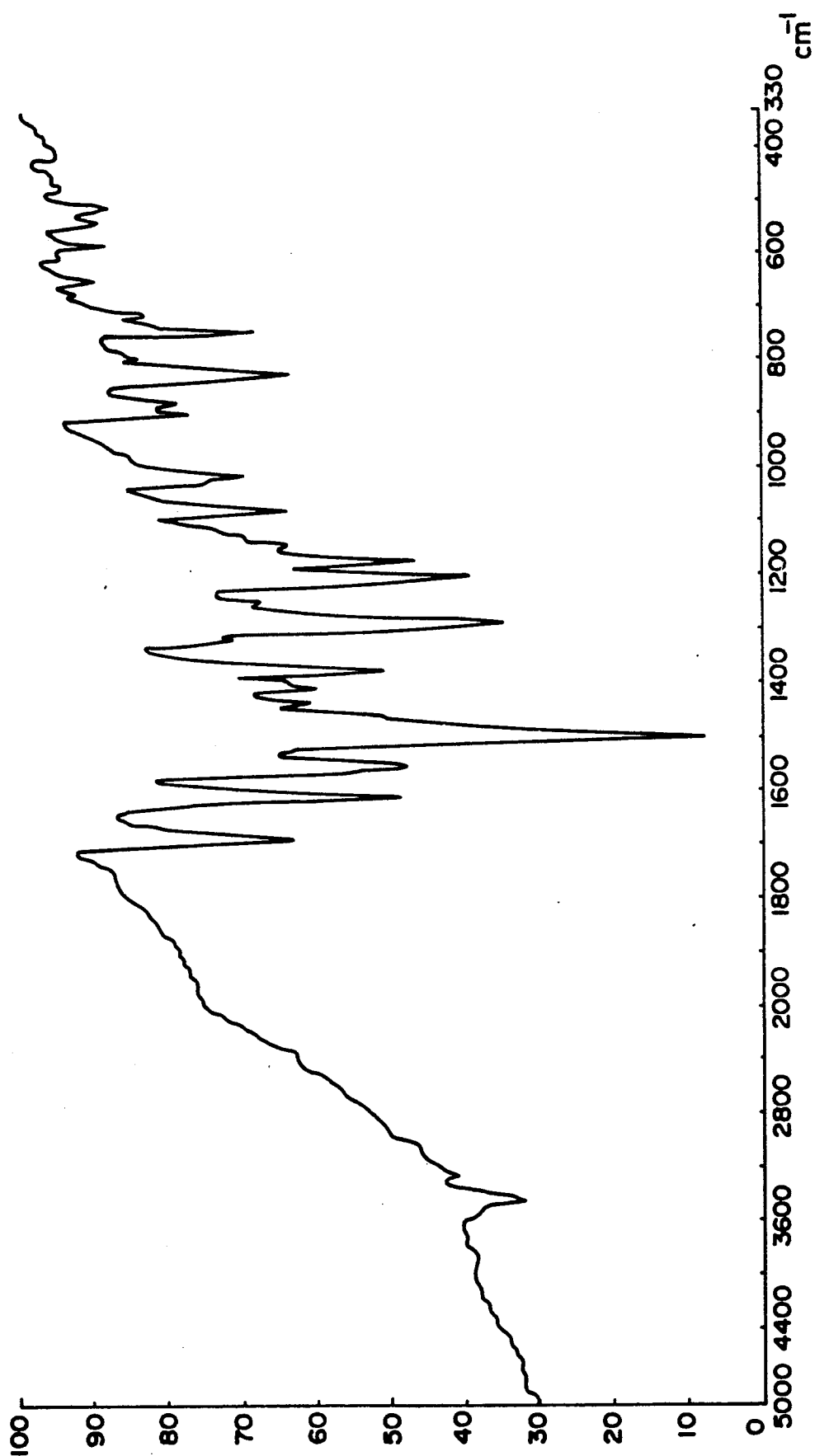

An electrophotographic photoconductor according to the present invention comprises an electroconductive support and a photoconductive layer formed thereon comprising a bisazo compound having formula (I) serving as a charge generating material:

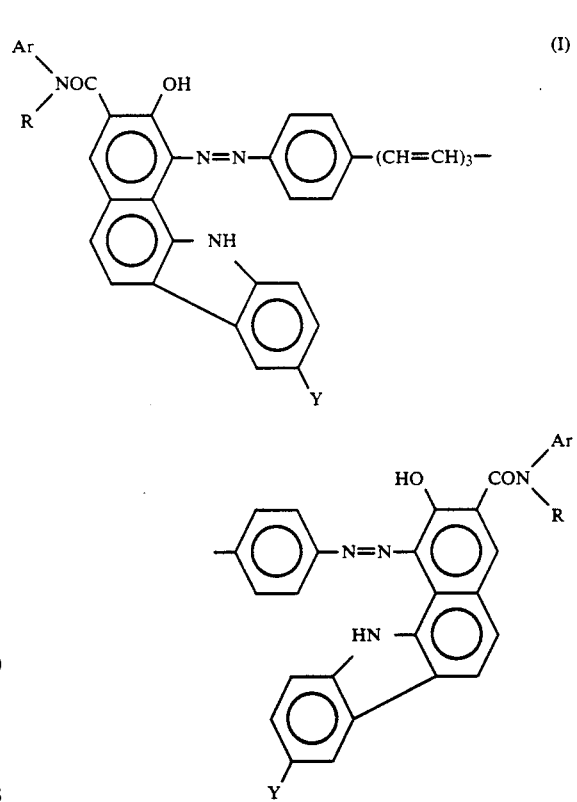

wherein Y represents a halogen, an alkyl group having 1 to 4 carbon atoms, which may have a substituent, an alkoxyl group having 1 to 4 carbon atoms, an acyl group having 1 to 4 carbon atoms, a substituted amino group, a cyano group or a nitro group; R represents hydrogen, or an alkyl group having 1 to 4 carbon atoms, which may have a substituent; and Ar represents an aryl group which may have a substituent.

As the substituted amino group represented by Y in the above formula (I), a dialkyl amino group, each alkyl group having 1 to 4 carbon atoms, can be employed. Examples of the substituent of an aryl group represented by Ar in the formula (I) are an alkyl group having 1 to 4 carbon atoms, an alkoxyl group having 1 to 4 carbon atoms, a nitro group, CF$_3$, and a halogen.

Examples of the above-mentioned bisazo compounds of formula (I) are as follows:

TABLE 1

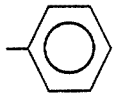

| Bisazo Compound No. | Y | R | Ar |
|---|---|---|---|
| 1 | —Cl | —H | 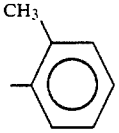 |
| 2 | —Cl | —H | 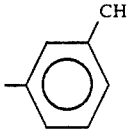 (CH$_3$ ortho) |
| 3 | —Cl | —H | 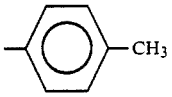 (CH$_3$ meta) |
| 4 | —Cl | —H | 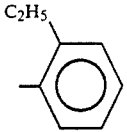 (CH$_3$ para) |
| 5 | —Cl | —H | 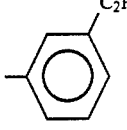 (C$_2$H$_5$ ortho) |
| 6 | —Cl | —H | 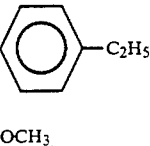 (C$_2$H$_5$ meta) |
| 7 | —Cl | —H | 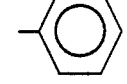 (C$_2$H$_5$ para) |
| 8 | —Cl | —H | (OCH$_3$ ortho phenyl) |

TABLE 1-continued

[Structure: Ar(R)N-OC and OH groups on naphthalene with NH-phenyl(Y) substituent, linked via -N=N- to phenyl-(CH=CH)₃-phenyl, then -N=N- to symmetric naphthalene system with HO, CON(R)Ar, HN-phenyl(Y)]

| Bisazo Compound No. | Y | R | Ar |
|---|---|---|---|
| 9 | —Cl | —H | 3-methoxyphenyl (—OCH₃) |
| 10 | —Cl | —H | 4-methoxyphenyl (—OCH₃) |
| 11 | —Cl | —H | 2-chlorophenyl (Cl) |
| 12 | —Cl | —H | 3-chlorophenyl (Cl) |
| 13 | —Cl | —H | 4-chlorophenyl (Cl) |
| 14 | —Cl | —H | 2-nitrophenyl (NO₂) |
| 15 | —Cl | —H | 3-nitrophenyl (NO₂) |
| 16 | —Cl | —H | 4-nitrophenyl (NO₂) |
| 17 | —Cl | —H | 2-(trifluoromethyl)phenyl (CF₃) |

TABLE 1-continued
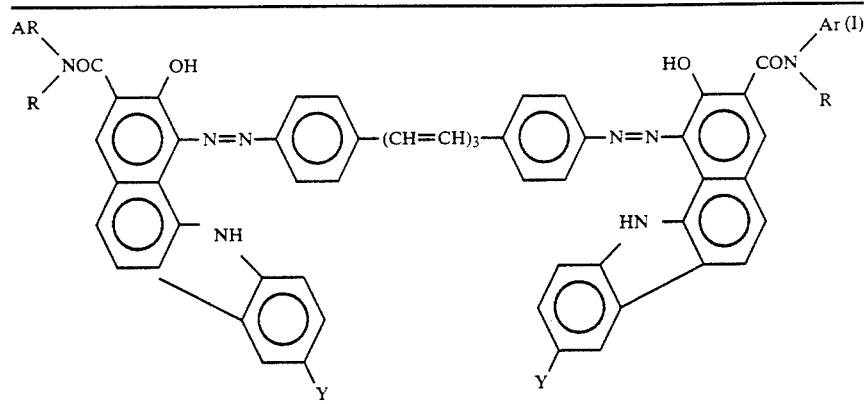
| Bisazo Compound No. | Y | R | Ar |
|---|---|---|---|
| 18 | —Cl | —H | 3-CF₃-phenyl |
| 19 | —Cl | —H | 4-CF₃-phenyl |
| 20 | —Cl | —H | 2,5-dimethylphenyl |
| 21 | —Cl | —H | 4-chloro-2-methylphenyl |
| 22 | —Cl | —H | 4-chloro-3-methylphenyl |
| 23 | —Cl | —H | 3,5-dimethoxyphenyl |
| 24 | —Cl | —CH₃ | phenyl |
| 25 | —CH₃ | —H | phenyl |

TABLE 1-continued
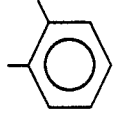
| Bisazo Compound No. | Y | R | Ar |
|---|---|---|---|
| 26 | —$CH_3$ | —H | 2-methylphenyl |
| 27 | —$CH_3$ | —H | 3-methylphenyl |
| 28 | —$CH_3$ | —H | 4-methylphenyl |
| 29 | —$CH_3$ | —H | 2-chlorophenyl |
| 30 | —$CH_3$ | —H | 3-chlorophenyl |
| 31 | —$CH_3$ | —H | 4-chlorophenyl |
| 32 | —$CH_3$ | —H | 2,5-dimethylphenyl |
| 33 | —$CH_3$ | —H | 3-chloro-5-methylphenyl |

TABLE 1-continued
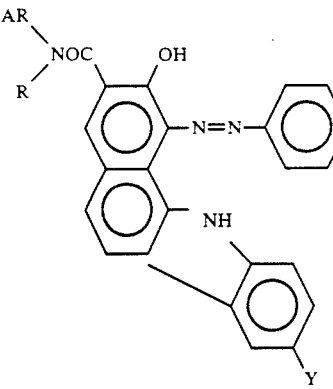
| Bisazo Compound No. | Y | R | Ar |
|---|---|---|---|
| 34 | —CH₃ | —H | 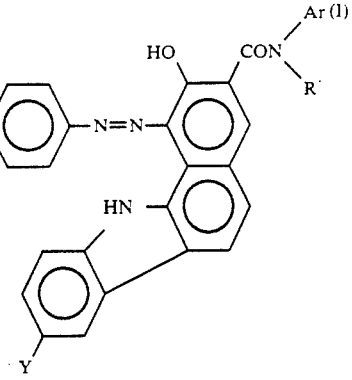 |
| 35 | —OCH₃ | —H | 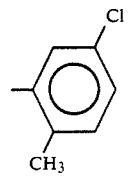 |
| 36 | —OCH₃ | —H | 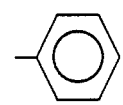 |
| 37 | —OCH₃ | —H | 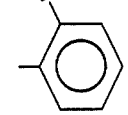 |
| 38 | —OCH₃ | —H | 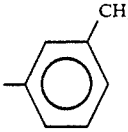 |
| 39 | —OCH₃ | —H | 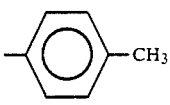 |
| 40 | —OCH₃ | —H | 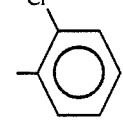 |
| 41 | —OCH₃ | —H | 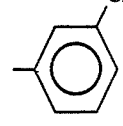 |

TABLE 1-continued
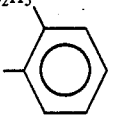
| Bisazo Compound No. | Y | R | Ar |
|---|---|---|---|
| 42 | —OCH₃ | —H | 2-ethylphenyl |
| 43 | —OCH₃ | —H | 3-ethylphenyl |
| 44 | —OCH₃ | —H | 4-ethylphenyl |
| 45 | —OCH₃ | —H | 2-methoxyphenyl |
| 46 | —OCH₃ | —H | 3-methoxyphenyl |
| 47 | —OCH₃ | —H | 4-methoxyphenyl |
| 48 | —Cl | —H | naphthyl |
| 49 | —CN | —H | phenyl |

TABLE 1-continued

| Bisazo Compound No. | Y | R | Ar |
|---|---|---|---|
| 50 | —COCH₃ | —H | phenyl |
| 51 | —NO₂ | —H | phenyl |
| 52 | —N(CH₃)₂ | —H | phenyl |

Among the above-listed bisazo compounds, the bisazo compounds having formula (II) are novel.

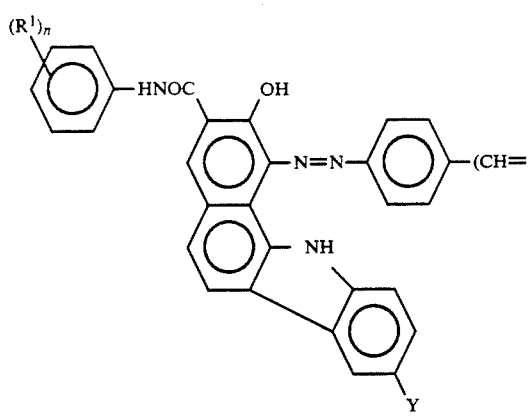

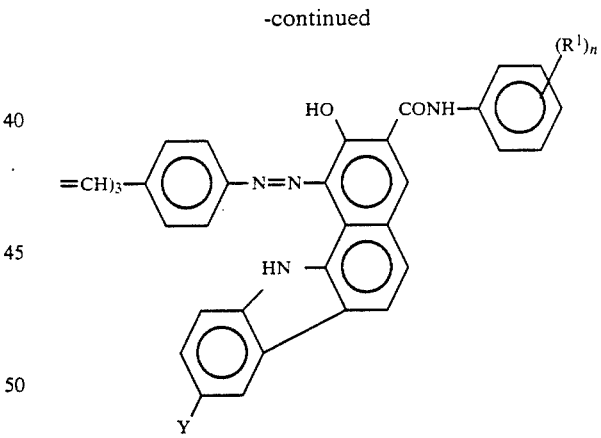

(II)

wherein Y represents a chlorine atom, a methyl group or a methoxy group; $R^1$ represents hydrogen, an alkyl group having 1 to 4 carbon atoms, an alkoxyl group having 1 to 4 carbon atoms, a halogen or a nitro group; and n is 1 or 2, and when n is 2, $R^1$ may be the same or different.

The bisazo compounds of formula (II) according to the present invention can be obtained by a coupling reaction of a tetrazonium salt of formula (III) with a coupler of formula (IV).

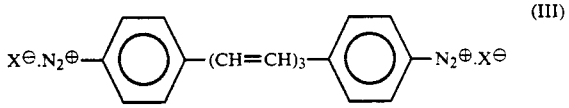

wherein X represents an anionic functional group.

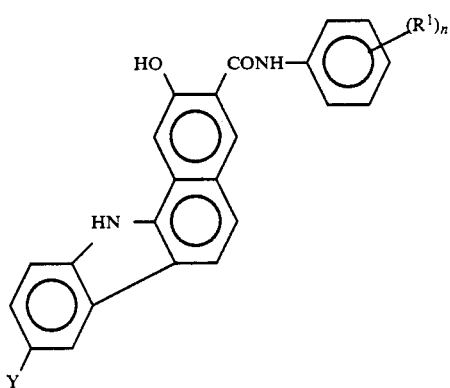

wherein Y, $R^1$ and n are the same as those defined in the above formula (II).

Specific examples of the anionic functional group represented by X in formula (III) include $Cl^\ominus$, $Br^\ominus$, $I^\ominus$, $BF_4^\ominus$, $PF_6^\ominus$, $B(C_6H_5)_4^\ominus$, $ClO_4^\ominus$, $SO_4^{2\ominus}$,

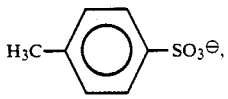

$AsF_6^\ominus$, and $SbF_6^\ominus$. Among the above anionic functional groups, $BF_4^\ominus$ preferable for the preparation of the bisazo compound according to the present invention.

Specifically, the bisazo compound of formula (II) is prepared as follows:

The tetrazonium salt of formula (III), used as a starting material for the preparation of the bisazo compound of formula (II), can be obtained by diazotization of 1,6-bis(4-aminophenyl)-1,3,5-hexatriene (hereinafter referred to as the diamino compound), which is obtained by reduction of 1,6-bis(4-nitrophenyl)-1,3,5-hexatriene (hereinafter referred to as the dinitro compound). The dinitro compound and the diamino compound for use in the present invention are both novel materials.

To prepare the dinitro compound necessary for the synthesis of the bisazo compound according to the present invention, modified Witting reaction is initiated, for example, by subjecting 4-nitrobenzyl diethyl phosphonate and 5-(4-nitrophenyl)-2,4-pentadienal-1 to condensation in the presence of a basic catalyst. Alternatively, Witting reaction is initiated, for example, by subjecting 1,4-bis(triphenylphosphonium chloride)-2-butene and 4-nitrobenzaldehyde to condensation in the presence of a basic catalyst.

The dinitro compound obtained by the above-mentioned Witting reaction has a moiety of cis-configuration, but can be converted into a trans form as a whole in such a manner that the crude or purified product of the dinitro compound is heated together with iodine in such an amount that can work as a catalyst for the reaction, in an aromatic hydrocarbon solvent such as toluene and xylene.

The thus obtained dinitro compound is reduced by heating it to temperatures of 70° C. to 120° C. using a reducing agent such as iron - hydrochloric acid and stannous chloride - hydrochloric acid, so that the diamino compound is prepared. This reaction is completed in about 0.5 to 3 hours. It is preferable that such reduction be carried out in an organic solvent such as N,N-dimethylformamide when iron - hydrochloric acid is employed as the reducing agent.

In the next stage, diazotization of the above-prepared diamino compound is performed by dispersing the diamino compound in an inorganic acid such as hydrochloric acid or sulphuric acid and adding sodium nitrite to this dispersion, with the temperature maintained at −10° C. to 20° C. This diazotization is completed in about 0.5 to 3 hours.

Through the above-mentioned series of the reaction, the tetrazonium salt of formula (III) can be obtained. Alternatively, by adding an aqueous solution of borofluoric acid or sodium borofluoride to the above diazotization reaction mixture, the tetrazonium salt of formula (III) can also be obtained.

In order to obtain the bisazo compound of formula (II) according to the present invention, the above-prepared tetrazonium salt of formula (III) is isolated from the reaction mixture and dissolved together with the coupler of formula (IV) in an organic solvent such as N,N-dimethylformamide and dimethyl sulfoxide. To this solution, an alkaline aqueous solution such as an aqueous solution of sodium acetate is added dropwise, with the temperature maintained at about −10° C. to 40° C., to initiate the coupling reaction. This coupling reaction is completed in about 5 minutes to 3 hours. After the completion of the coupling reaction, the resulting crystals are separated from the reaction solution by filtration, and washed with water and/or an organic solvent or recrystallized, whereby a desired bisazo compound can be obtained. The bisazo compound can also be obtained by allowing the above-prepared diazotization reaction mixture to react with the coupler.

The present invention will now be explained by referring to the following synthesis examples of the bisazo compounds of formula (II) according to the present invention.

SYNTHESIS EXAMPLE 1

[Preparation of 1,6-bis[4-(2-hydroxy-3-phenylcarbamoyl-8-chloro-11H-benzo[a]carbazolyl-1-azo)phenyl-1,3,5-hexatriene (Bisazo Compound No. 1 in Table 1)]

0.6 g of 2-hydroxy-3-phenylcarbamoyl-8-chloro-11H-benzo[a]carbazol was dissolved in 70 ml of dimethylformamide. To this solution, 0.345 g of 1,6-diphenyl-1,3,5-hexatriene-4',4''-bis(diazonium tetrafluoroborate), whose manufacturing method was described in Japanese Laid-Open Patent Application No. 58-222152, was added, and 3.1 ml of 8.3% aqueous solution of sodium acetate was further added dropwise at room temperature. This mixture was stirred for 3 hours at room temperature, so that a bisazo compound was obtained. The thus obtained bisazo compound was filtered, washed with 100 ml of dimethylformamide six times, and further washed with 100 ml of water twice. Then, the bisazo compound was dried under reduced pressure, whereby 0.59 g of 1,6-bis[4-(2-hydroxy-3-phenylcarbamoyl-8-chloro-11H-benzo[a]carbazolyl-1-azo)phenyl-1,3,5-hexatriene (Bisazo Compound No. 1 in Table 1) was obtained in the form of a bluish black powder.

FIG. 1 shows an infrared spectrum of 1,6-bis[4-(2-hydroxy-3-phenylcarbamoyl-8-chloro-11H-benzo[a]-carbazolyl-1-azo)phenyl-1,3,5-hexatriene, taken by use of a KBr tablet, which indicates an absorption at 3450 cm$^{-1}$ characteristic of NH stretching vibration of carbazole, at 1670 cm$^{-1}$ characteristic of stretching vibration of amidocarbonyl, and at 990 cm$^{-1}$ characteristic of deformation vibration of trans-olefin.

The exothermic peak temperature (decomposition point) of the product in a thermal analysis and the results of the elemental analysis are given in Table 2.

SYNTHESIS EXAMPLES 2 TO 16

The procedure for Synthesis Example 1 was repeated except that the coupler employed in Synthesis Example 1 was replaced by the respective couplers, of formula (IV) shown in the following Table 2, whereby the bisazo compounds according to the present invention were obtained as shown in Table 2.

Infrared spectra of the bisazo compounds obtained in Synthesis Examples 2, 3, 10 and 16 are respectively shown in FIG. 2, FIG. 3, FIG. 4 and FIG. 5.

TABLE 2

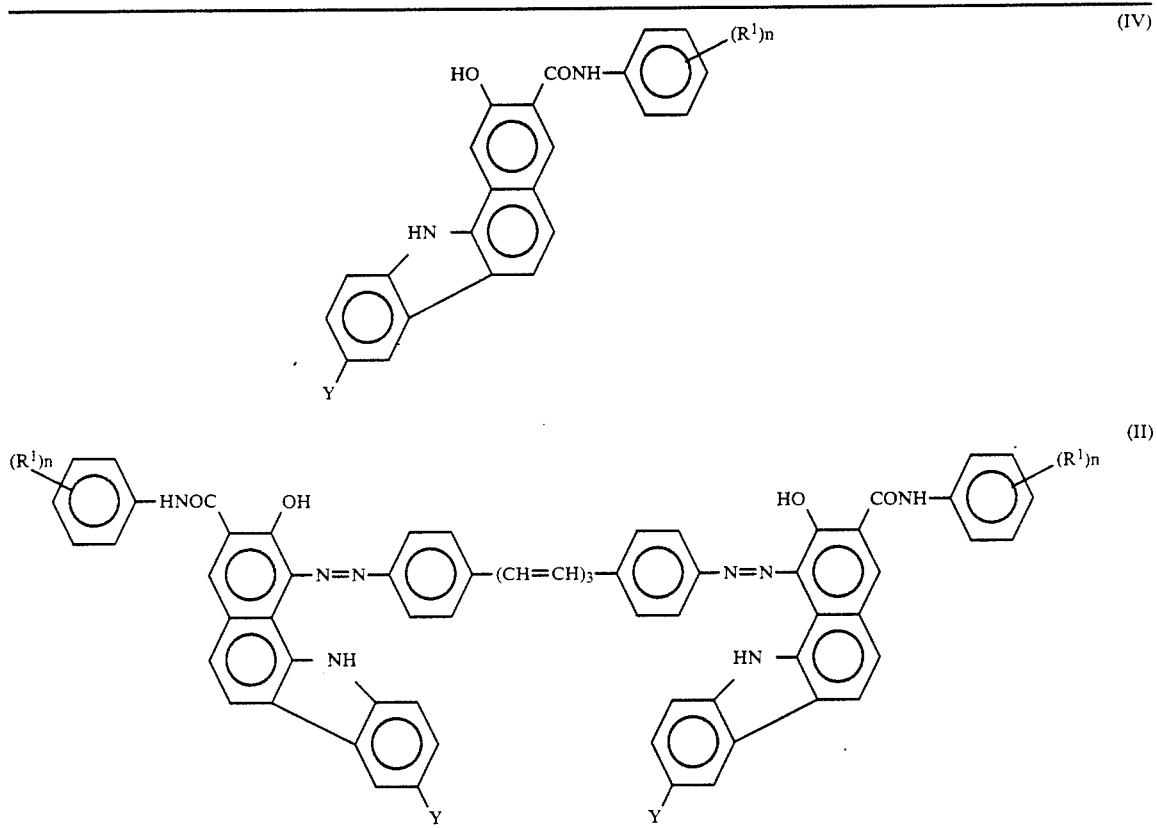

| Example No. | Y | ─(R$^1$)n | Elemental Analysis Found (%)/Counted (%) C | H | N | Exothermic Peak Temp. (°C.) |
|---|---|---|---|---|---|---|
| 1 | —Cl | —H | 72.33 | 3.67 | 10.29 | 319 |
| Bisazo Compound No. 1 in Table 1 | | | (72.64) | (4.01) | (10.59) | |
| 2 | —OCH$_3$ | —H | 75.69 | 4.32 | 10.37 | 306 |
| Bisazo Compound No. 35 in Table 1 | | | (75.55) | (4.62) | (10.68) | |
| 3 | —CH$_3$ | —H | 77.79 | 4.60 | 10.60 | 312 |
| Bisazo Compound No. 25 in Table 1 | | | (77.92) | (4.77) | (11.02) | |
| 4 | —CH$_3$ | 4-CH$_3$ | 78.02 | 4.89 | 10.42 | 305 |
| Bisazo Compound No. 28 in Table 1 | | | (78.13) | (5.02) | (10.72) | |
| 5 | —Cl | 3-CH$_3$ | 72.84 | 4.00 | 10.31 | 327 |
| Bisazo Compound No. 3 in Table 1 | | | (72.98) | (4.28) | (10.32) | |
| 6 | —Cl | 2-OCH$_3$ | 70.68 | 3.79 | 9.67 | 322 |
| Bisazo Compound No. 8 in Table 1 | | | (70.89) | (4.15) | (10.02) | |
| 7 | —Cl | 3-OCH$_3$ | 70.57 | 3.80 | 9.65 | 317 |
| Bisazo Compound No. 9 in Table 1 | | | | | | |
| 8 | —Cl | 4-OCH$_3$ | 70.23 | 3.96 | 9.52 | 309 |
| Bisazo Compound No. 10 in Table 1 | | | | | | |
| 9 | —Cl | 2-CH$_3$ | 72.66 | 4.00 | 10.18 | 324 |
| Bisazo Compound No. 2 in Table 1 | | | (72.98) | (4.28) | (10.32) | |
| 10 | —Cl | 4-CH$_3$ | 72.51 | 3.98 | 10.11 | 308 |
| Bisazo Compound No. 4 in Table 1 | | | | | | |
| 11 | —Cl | 2-Cl | 67.95 | 3.39 | 9.86 | 302 |
| Bisazo Compound No. 11 in Table 1 | | | (68.20) | (3.58) | (9.94) | |
| 12 | —Cl | 3-Cl | 68.19 | 3.33 | 9.67 | 308 |

TABLE 2-continued

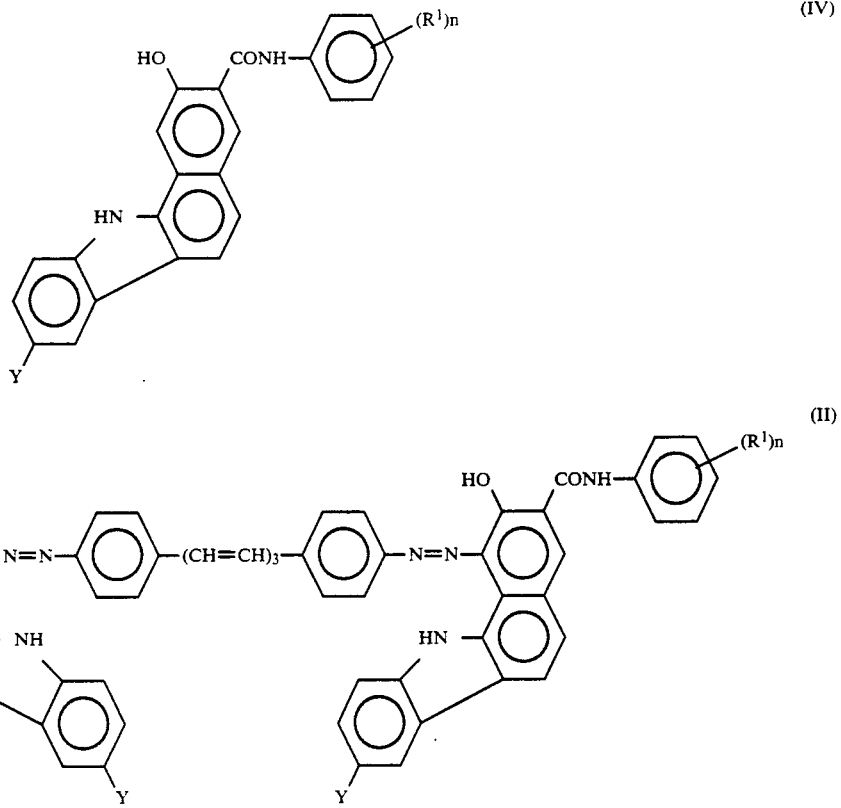

| Example No. | Y | (R¹)n | Elemental Analysis Found (%)/Counted (%) | | | Exothermic Peak Temp. (°C.) |
|---|---|---|---|---|---|---|
| | | | C | H | N | |
| Bisazo Compound No. 12 in Table 1 13 | —Cl | 4-Cl | 67.76 | 3.40 | 9.94 | 312 |
| Bisazo Compound No. 13 in Table 1 14 | —Cl | 2-NO₂ | 66.66 (66.95) | 3.26 (3.52) | 12.15 (12.20) | 312 |
| Bisazo Compound No. 14 in Table 1 15 | —Cl | 3-NO₂ | 66.50 | 3.29 | 12.20 | 319 |
| Bisazo Compound No. 15 in Table 1 16 | —Cl | 2-CH₃, 4-Cl | 68.44 (68.62) | 3.47 (3.85) | 9.47 (9.70) | 306 |
| Bisazo Compound No. 22 in Table 1 | | | | | | |

In the electrophotographic photoconductor according to the present invention, the bisazo compound of formula (I) is contained in a photoconductive layer as a charge generating material. The bisazo compounds can be employed in different ways, for example, as shown in FIG. 6 and FIG. 7.

Figure 6:
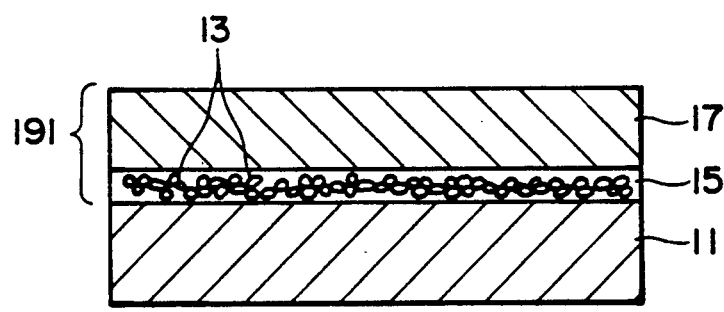
FIG. 6 is a schematic cross-sectional view of an example of an electrophotographic photoconductor according to the present invention.

In an electrophotographic photoconductor as shown in FIG. 6, there is formed on an electroconductive support 11 a two-layered type photoconductive layer 191 comprising a charge generation layer 15 which mainly comprises a bisazo compound 13 serving as a charge generating material, and a charge transport layer 17 which contains a charge transporting material.

In this photoconductor, light which has passed through the charge transport layer 17 reaches the charge generation layer 15. The charge carriers which are necessary for the light decay for latent electrostatic image formation are generated by the bisazo compound 13 contained in the charge generation layer 15, accepted and transported by the charge transport layer 17.

Figure 7:
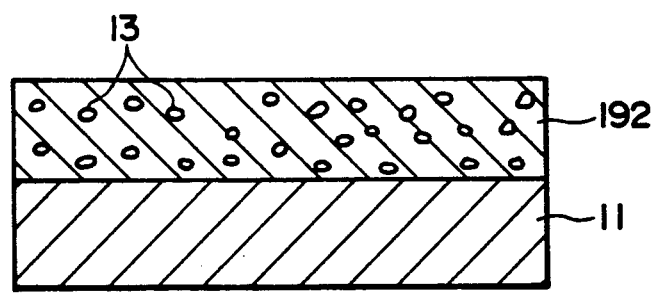
FIG. 7 is a schematic cross-sectional view of another example of an electrophotographic photoconductor according to the present invention.

In an electrophotographic photoconductor as shown in FIG. 7, there is formed on an electroconductive support 11 a photoconductive layer 192 comprising a bisazo compound 13, a charge transporting material and an insulating binder agent. In this photoconductor, the bisazo compound 13 functions as a charge generating material.

In addition to the photoconductors as shown in FIG. 6 and FIG. 7, a photoconductor in which the overlaying order of the charge generation layer 15 containing the bisazo compound 13 and the charge transport layer 17 is reversed as compared with the electrophotographic photoconductor as shown in FIG. 6 can be employed.

In the photoconductor as shown in FIG. 6, it is preferable that the thickness of the charge generation layer 15 of the photoconductive layer 191 be in the range of 0.01 μm to 5 μm, more preferably in the range of 0.05 μm to 2 μm. When the thickness of the charge generation layer 15 is within the above range, the charge carriers are sufficiently generated in the charge generation layer 15 for the light decay for latent electrostatic image formation, and at the same time, there is no problem of high residual electric potential.

It is preferable that the thickness of the charge transport layer 17 be in the range of 3 μm to 50 μm, more preferably in the range of 5 μm to 20 μm. When the thickness of the charge transport layer 17 is within the above range, the electrical charge quantity is sufficient for practical use, and there is no problem of extremely high residual electric potential.

The charge generation layer 15 comprises the bisazo compound of formula (I), a binder agent and a plasticizer. It is preferable that the amount of the bisazo compound contained in the charge generation layer 15 be 30 wt. % or more, more preferably 50 wt. % or more.

The charge transport layer 17 comprises the charge transporting material, a binder agent and a plasticizer. It is preferable that the amount of the charge transporting material contained in the charge transport layer 17 be in the range of 10 wt. % to 95 wt. %, more preferably in the range of 30 wt. % to 90 wt. % from the viewpoints of effective transportation of the charge carriers and mechanical surface strength of the photoconductor.

In the photoconductor as shown in FIG. 7, it is preferable that the thickness of the photoconductive layer 192 be in the range of 3 μm to 50 μm, more preferably in the range of 5 μm to 20 μm.

It is preferable that the amount of the bisazo compound 13 contained in the photoconductive layer 192 be 50 wt. % or less, more preferably 20 wt. % or less. It is preferable that the amount of the charge transporting material contained in the photoconductive layer 192 be in the range of 10 wt. % to 95 wt. %, more preferably in the range of 30 wt. % to 90 wt. %.

In the electrophotographic photoconductors according to the present invention, conventional materials can be employed for each element such as the electroconductive support and the charge transporting material.

Specific examples of the electroconductive support used for the electrophotographic photoconductor according to the present invention include a metallic plate made of aluminum, copper and zinc, a plastic sheet made of polyester, a plastic film on which a metal such as aluminum and tin dioxide is evaporated, and a sheet of paper which has been treated so as to be electroconductive.

Examples of the binder agent for use in the present invention are condensation resins such as polyamide, polyurethane, polyester, epoxy resin, polyketone, polycarbonate and polyacetal; and vinyl polymers such as polyvinylketone, polystyrene, poly-N-vinylcarbazole and polyacrylamide. Besides the above-listed binder agents, other conventional electrically insulating and adhesive resins can be used.

Specific examples of the plasticizer for use in the present invention are halogenated paraffin, polybiphenyl chloride, dimethylnaphthalene and dibutyl phthalate. In addition, silicone oil can be added to the photoconductor to improve the surface properties thereof.

As the charge transporting materials, there are positive hole transporting materials and electron transporting materials.

Examples of the positive hole transporting materials are the compounds represented by the following formulas (1) through (13):

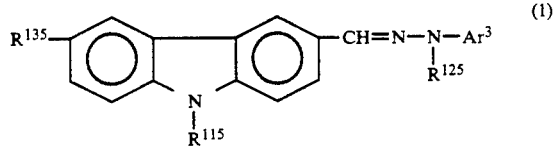

wherein $R^{115}$ represents an unsubstituted or substituted alkyl group such as a methyl group, an ethyl group, a 2-hydroxyethyl group, a 2-chloroethyl group or a benzyl group, or an unsubstituted or substituted phenyl group; $R^{125}$ represents a methyl group, an ethyl group, a benzyl group, or an unsubstituted or substituted phenyl group; $Ar^3$ represents an unsubstituted or substituted phenyl group or a naphthyl group; and $R^{135}$ represents hydrogen, chlorine, bromine, an alkyl group having 1 to 4 carbon atoms, an alkoxyl group having 1 to 4 carbon atoms, dialkylamino group or a nitro group.

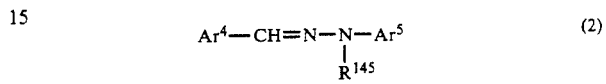

wherein $Ar^4$ represents an unsubstituted or substituted naphthalene ring, an unsubstituted or substituted anthracene ring, an unsubstituted or substituted styryl group, a pyrydine ring, a furan ring, or a thiophene ring; $R^{145}$ represents an unsubstituted or substituted alkyl group or an unsubstituted or substituted phenyl group; and $Ar^5$ represents an unsubstituted or substituted phenyl group or a naphthyl group.

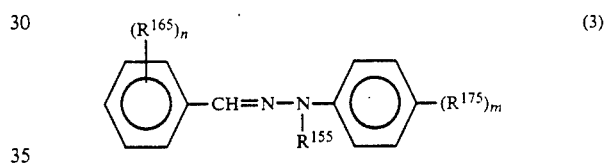

wherein $R^{155}$ represents an unsubstituted or substituted alkyl group, an unsubstituted or substituted phenyl group or a naphthyl group; $R^{165}$ and $R^{175}$ each represent hydrogen, an alkyl group having 1 to 3 carbon atoms, an alkoxyl group having 1 to 3 carbon atoms, a dialkylamino group, a diaralkylamino group or a diarylamino group; and m and n each represent an integer of 1 to 4, and when both m and n are 2 or more, $R^{165}$ and $R^{175}$ may be the same or different.

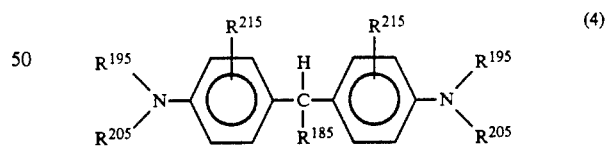

wherein $R^{185}$ represents an alkyl group having 1 to 11 carbon atoms, an unsubstituted or substituted phenyl group or a heterocyclic ring; $R^{195}$ and $R^{205}$, which may be the same or different, each represent hydrogen, an alkyl group having 1 to 4 carbon atoms, a hydroxyalkyl group, a chloroalkyl group, an unsubstituted or substituted aralkyl group or an aryl group, and may be bonded to each other to form a heterocyclic ring containing nitrogen atom(s); and each $R^{215}$, which may be the same or different, represents hydrogen, an alkyl group having 1 to 4 carbon atoms, an alkoxyl group or a halogen.

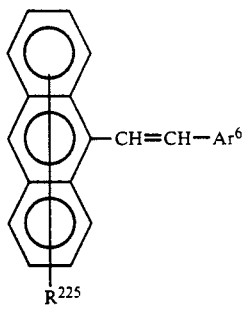

wherein $R^{225}$ represents hydrogen or a halogen; and $Ar^6$ represents an unsubstituted or substituted phenyl group, a naphthyl group, an anthryl group or a carbazolyl group.

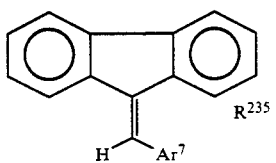

wherein $R^{235}$ represents hydrogen, a halogen, a cyano group, an alkoxyl group having 1 to 4 carbon atoms or an alkyl group having 1 to 4 carbon atoms; $Ar^7$ represents

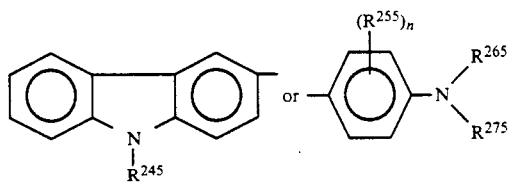

wherein $R^{245}$ represents an unsubstituted or substituted alkyl group or an unsubstituted or substituted phenyl group; $R^{255}$ represents hydrogen, a halogen, an alkyl group having 1 to 4 carbon atoms, an alkoxyl group having 1 to 4 carbon atoms or a dialkylamino group; n is 1 or 2, and when n is 2, each $R^{255}$ may be the same or different; and $R^{265}$ and $R^{275}$ each represent hydrogen, an unsubstituted or substituted alkyl group having 1 to 4 carbon atoms, an unsubstituted or substituted benzyl group or an unsubstituted or substituted phenyl group.

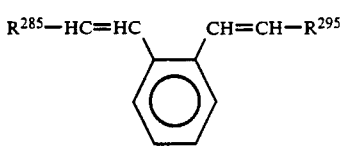

wherein $R^{285}$ and $R^{295}$ each represent a carbazolyl group, a pyridyl group, a thienyl group, an indolyl group, a furyl group, an unsubstituted or substituted phenyl group, an unsubstituted or substituted styryl group, an unsubstituted or substituted naphthyl group, or an unsubstituted or substituted anthryl group, which may have a substituent selected from the group consisting of a dialkylamino group including a substituted alkyl group, an unsubstituted or substituted diarylamino group, an alkyl group, an alkoxyl group, a carboxyl group or an ester thereof, halogen, a cyano group, an amino group, a nitro group and an acetylamino group.

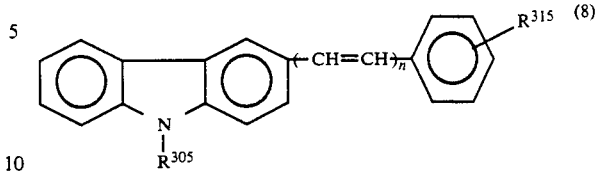

wherein $R^{305}$ represents an unsubstituted or substituted alkyl group, or an unsubstituted or substituted phenyl group; $R^{315}$ represents hydrogen, a lower alkyl group, a lower alkoxyl group, a halogen, a nitro group, a dialkylamino group including an alkyl group which may have as a substituent an amino group, or an unsubstituted or substituted diarylamino group; and n is 1 or 2.

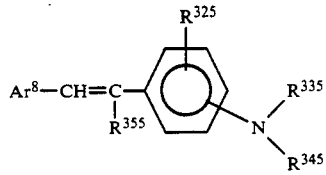

wherein $R^{325}$ represents hydrogen, an alkyl group, an alkoxyl group or a halogen; $R^{335}$ and $R^{345}$, which may be the same or different, each represent an unsubstituted or substituted alkyl group, or an unsubstituted or substituted aryl group; $R^{355}$ represents an unsubstituted or substituted phenyl group; and $Ar^8$ represents an unsubstituted or substituted aryl group.

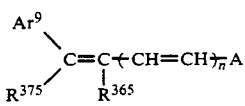

wherein n is 0 or 1; $R^{365}$ represents hydrogen, an unsubstituted or substituted alkyl group, or an unsubstituted or substituted phenyl group; $Ar^9$ represents an unsubstituted or substituted aryl group; $R^{375}$ represents an unsubstituted or substituted alkyl group, or an unsubstituted or substituted aryl group, and $Ar^9$ and $R^{375}$ may form a ring in combination; and A represents

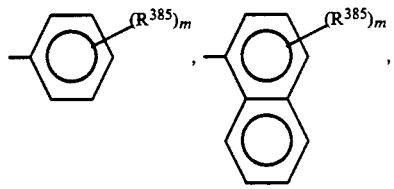

a 9-anthryl group, or an unsubstituted or substituted carbazolyl group.

wherein $R^{385}$ represents hydrogen, an alkyl group, an alkoxyl group, a halogen, or

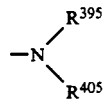

wherein $R^{395}$ and $R^{405}$ each represent an unsubstituted or substituted alkyl group, or an unsubstituted or substituted aryl group, and $R^{395}$ and $R^{405}$ may be the same or different and may form a ring in combination;

and m is an integer of 0, 1, 2 or 3, and when m is 2 or more, each $R^{385}$ may be the same or different.

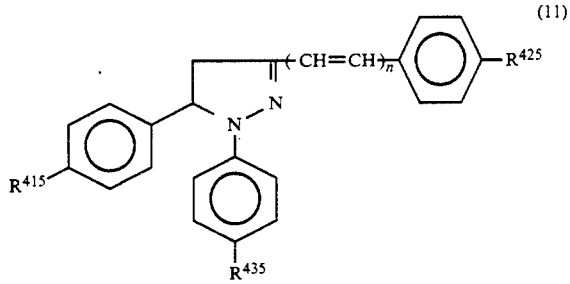
(11)

wherein $R^{415}$, $R^{425}$ and $R^{435}$ each represent hydrogen, a lower alkyl group, a lower alkoxyl group, a dialkylamino group or a halogen; and n is 0 or 1.

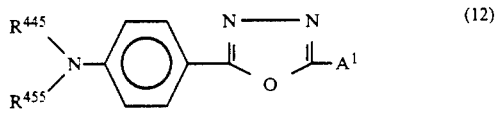
(12)

wherein $R^{445}$ and $R^{455}$ each represent an unsubstituted or substituted alkyl group, or an unsubstituted or substituted aryl group; and $A^1$ represents a substituted amino group, an unsubstituted or substituted aryl group, or an allyl group.

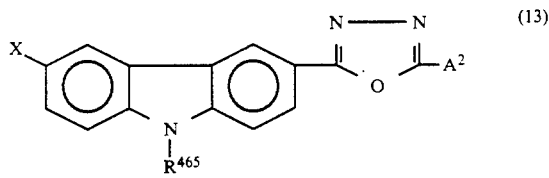
(13)

wherein X represents hydrogen or a halogen; $R^{465}$ represents an unsubstituted or substituted alkyl group, or an unsubstituted or substituted aryl group; and $A^2$ represents a substituted amino group, an unsubstituted or substituted aryl group, or an allyl group.

Specific examples of the compounds represented by the above formula (1) are 9-ethylcarbazole-3-aldehyde, 1-methyl-1-phenylhydrazone, 9-ethylcarbazole-3-aldehyde 1-benzyl-1-phenylhydrazone, and 9-ethylcarbazole-3-aldehyde 1,1-diphenylhydrazone.

Specific examples of the compounds represented by the above formula (2) are 4-diethylaminostylene-β-aldehyde 1-methyl-1-phenylhydrazone, and 4-methoxynaphthalene-1-aldehyde 1-benzyl-1-phenylhydrazone.

Specific examples of the compounds represented by the above formula (3) are 4-methoxybenzaldehyde 1-methyl-1-phenylhydrazone, 2,4-dimethoxybenzaldehyde 1-benzyl-1-phenylhydrazone, 4-diethylaminobenzaldehyde 1,1-diphenylhydrazone, 4-methoxybenzaldehyde 1-benzyl-1-(4-methoxy) phenylhydrazone, 4-diphenylaminobenzaldehyde 1-benzyl-1-phenylhydrazone, and 4-dibenzylaminobenzaldehyde-1,1-diphenylhydrazone.

Specific examples of the compounds represented by the above formula (4) are 1,1-bis(4-dibenzylaminophenyl)propane, tris(4-diethylaminophenyl)methane, 1,1-bis(4-dibenzylaminophenyl)propane, and 2,2'-dimethyl-4,4'-bis(diethylamino)triphenylmethane.

Specific examples of the compounds represented by the above formula (5) are 9-(4-diethylaminostyryl)anthracene, and 9-bromo-10-(4-diethylaminostyryl)anthracene.

Specific examples of the compounds represented by the above formula (6) are 9-(4-dimethylaminobenzylidene)fluorene and 3-(9-fluorenylidene)-9-ethylcarbazole.

Specific examples of the compounds represented by the above formula (7) are 1,2-bis(4-diethylaminostyryl)benzene and 1,2-bis(2,4-dimethoxystyryl)benzene.

Specific examples of the compounds represented by the above formula (8) are 3-styryl-9-ethylcarbazole and 3-(4-methoxystyryl)-9-ethylcarbazole.

Specific examples of the compounds represented by the above formula (9) are 4-diphenylaminostilbene, 4-dibenzylaminostilbene, 4-ditolylaminostilbene, 1-(4-diphenylaminostyryl)naphthalene, and 1-(4-diethylaminostyryl)naphthalene.

Specific examples of the compounds represented by the above formula (10) are 4'-diphenylamino-α-phenylstilbene, 4'-methylphenylamino-α-phenylstilbene, 5-[4-(di-p-tolylamino)benzylidene]-5H-dibenzo[a,d]cycloheptane, and 5-[4-(di-p-tolylamino)benzylidene]-5H-dibenzo[a,d]cycloheptene.

Specific examples of the compounds represented by the above formula (11) are 1-phenyl-3-(4-diethylaminostyryl)-5-(4-diethylaminophenyl)pyrazoline, and 1-phenyl-3-(4-dimethylaminostyryl)-5-(4-dimethylaminophenyl)pyrazoline.

Specific examples of the compounds represented by the above formulas (12) and (13) are 2,5-bis(4-diethylaminophenyl)-1,3,4-oxadiazole, 2,5-bis[4-(4-diethylaminostyryl) pheny]-1,3,4-oxadiazole, and 2-(9-ethylcarbazolyl-3-)-5-(4-diethylaminophenyl)-1,3,4-oxadiazole.

As other positive hole transporting materials, there are, for example, oxazole compounds such as 2-vinyl-4-(2-chlorophenyl)-5-(4-diethylaminophenyl)oxazole and 2-(4-diethylaminophenyl)-4-phenyloxazole; and low-molecular weight compounds of triphenylamine compounds, such as triphenylamine, tri-p-tolylamine, 4,4'-dimethoxytriphenylamine, N,N'-bis(3-methylphenyl)-N,N'-diphenylbenzidine, 1,1-bis(4-di-p-tolylaminophenyl)cyclohexane, and N,N,N',N'-tetra(p-tolyl)benzidine. In addition to the above compounds, the following polymeric compounds such as poly-N-vinylcarbazole, halogenated poly-N-vinylcarbazole, polyvinyl pyrene, polyvinyl anthracene, pyrene-formaldehyde resin and ethylcarbazole-formaldehyde resin can be employed.

Examples of the electron transporting materials are chloranil, bromanil, tetracyanoethylene, tetracyanoquinone dimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-4H-indeno[1,2-b] thiophene-4-on, and 1,3,7-trinitrodibenzothiophene-5,5-dioxide.

These charge transporting materials can be employed alone or in combination.

In the electrophotographic photoconductor according to the present invention, an adhesive layer or a barrier layer may be interposed between the electroconductive support and the photoconductive layer when necessary. The materials suitable for the adhesive layer or barrier layer are polyamide, nitrocellulose and aluminum oxide. It is preferable that the thickness of the adhesive layer or barrier layer be 1 μm or less.

The electrophotographic photoconductor as shown in FIG. 6 can be prepared by depositing a bisazo compound on an electroconductive support by vacuum deposition method as described in U.S. Pat. No. 3,973,959 and U.S. Pat. No. 3,996,049. Alternatively, a dispersion of finely-divided particles of the bisazo compound dispersed in an appropriate solvent, with a binder agent dissolved therein when necessary, may be coated on the electroconductive support and the coated dispersion may be dried. When necessary, the surface of the coated layer may be subjected to buffing as disclosed in Japanese Laid-Open Patent Application 51-90827, or the thickness of the coated layer may be adjusted appropriately. Finally, a solution of a charge transporting material and a binder agent is coated on the above prepared layer and dried.

The electrophotographic photoconductor as shown in FIG. 7 can be prepared by dispersing finely-divided particles of a bisazo compound in a solution in which a charge transporting material and a binder agent are dissolved, coating the dispersion on an electroconductive support, and drying the coated dispersion.

In any of the electrophotographic photoconductors according to the present invention, it is preferable that the particles of the bisazo compound be pulverized to 5 μm or less, more preferably 2 μm or less, in a ball mill. The coating of such bisazo compounds can be performed by the conventional means, such as a doctor blade and wire bar, or the conventional dipping method.

Copying by use of the electrophotographic photoconductor according to the present invention can be performed by a process comprising the steps of uniformly charging the surface of the photoconductive layer to a predetermined potential in the dark, exposing the uniformly charged photoconductive layer to a light image to form a latent electrostatic image on the photoconductive layer, and developing the latent electrostatic image with a developer to a visible image, and when necessary transferring the developed visible image to a transfer sheet such as a sheet of paper, and fixing the transferred image to the transfer sheet.

In the electrophotographic photoconductor according to the present invention, a bisazo compound having 1,6-diphenyl-1,3,5-hexatriene skeleton is used as a charge generating material. This photoconductor has advantages over the conventional photoconductors in that it can be easily manufactured, and it has high photosensitivity and uniform spectral absorbance not only in the entire visible light range, but also in the semiconductor laser wavelength region. Furthermore, the characteristics of this photoconductor can be maintained in the course of repeated practical use.

Other features of this invention will become apparent in the course of the following description of exemplary embodiments, which are given for illustration of the invention and are not intended to be limiting thereof.

EXAMPLE 1

7.5 parts by weight of a bisazo compound No. 11 in Table 1 and 500 parts by weight of a tetrahydrofuran solution of a polyester resin (Trademark "Vylon 200" made by Toyobo Company, Ltd.) with a solids content of 0.5% were dispersed and ground in a ball mill. The thus prepared dispersion was coated on an aluminum surface of an aluminum-deposited polyester film by a doctor blade, and dried at room temperature, so that a charge generation layer having a thickness of 1 μm was formed on the aluminum-deposited polyester film.

2 parts by weight of 9-ethylcarbazole-3-aldehyde 1-methyl-1-phenylhydrazone serving as a charge transporting material, 2 parts by weight of a polycarbonate resin (Trademark "Panlite K-1300" made by Teijin Limited.) and 16 parts by weight of tetrahydrofuran were mixed to form a solution. This solution was coated on the above formed charge generation layer by a doctor blade and then dried at 80° C for 2 minutes and then at 105° C for 5 minutes, so that a charge transport layer having a thickness of about 20 μm was formed on the charge generation layer. Thus a two-layered type electrophotographic photoconductor No. 1 according to the present invention was obtained.

EXAMPLES 2 TO 14

The procedure for Example 1 was repeated except that the bisazo compound No. 11 employed in Example 1 was replaced by the respective bisazo compounds listed in the following Table 3, whereby two-layered type electrophotographic photoconductors No. 2 to No. 14 according to the present invention were obtained.

EXAMPLES 15 TO 18

The procedure for Example 1 was repeated except that 9-ethylcarbazole-3-aldehyde 1-methyl-1-phenylhydrazone serving as a charge transporting material employed in Example 1 was replaced by 1-phenyl-3-(4-diethylaminostyryl)-5-(4-diethylaminophenyl)pyrazoline, and the bisazo compound No. 11 serving as a charge generating material employed in Example 1 was replaced by the respective bisazo compounds listed in the following Table 4, whereby two-layered type electrophotographic photoconductors No. 15 to No. 18 according to the present invention were obtained.

EXAMPLES 19 TO 33

The procedure for Example 1 was repeated except that 9-ethylcarbazole-3-aldehyde 1-methyl-1-phenylhydrazone serving as a charge transporting material employed in Example 1 was replaced by α-phenyl-4'-N,N-diphenylaminostilbene, and the bisazo compound No. 11 serving as a charge generating material employed in Example 1 was replaced by the respective bisazo compounds listed in the following Table 5, whereby two-layered type electrophotographic photoconductors No. 19 to No. 33 according to the present invention were obtained.

EXAMPLES 34 TO 49

The procedure for Examples 1 was repeated except that 9-ethylcarbazole-3-aldehyde 1-methyl-1-phenylhydrazone serving as a charge transporting material employed in Example 1 was replaced by 1,1-bis(4-dibenzylaminophenyl) propane, and the bisazo compound No. 11 serving as a charge generating material employed in Example 1 was replaced by the respective bisazo compounds listed in the following Table 6, whereby two-layered type electrophotographic photoconductors No. 34 to No. 49 according to the present invention were obtained.

Each of the thus prepared electrophotographic photoconductors No. 1 through No. 49 according to the present invention was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). Then, each electrophotographic photoconductor was allowed to stand in the dark for 20 seconds without applying any charge thereto, and the surface potential Vpo (V) of the photoconductor was measured. The photoconductor was then illuminated by a tungsten lamp in such a manner that the illuminance on the illuminated surface of the photoconductor was 4.5 lux, and the exposure $E_{\frac{1}{2}}$ (lux.sec) required to reduce the initial surface potential Vpo (V) to $\frac{1}{2}$ the initial surface potential Vpo was measured. The results are shown in Tables 3, 4, 5 and 6.

TABLE 3

| Photoconductor No. | Bisazo Compound No. | Vpo (V) | $E_{\frac{1}{2}}$ (lux · sec) |
|---|---|---|---|
| 1 | 11 | 250 | 0.50 |
| 2 | 12 | 103 | 0.53 |
| 3 | 14 | 826 | 6.63 |
| 4 | 15 | 172 | 0.82 |
| 5 | 25 | 857 | 0.66 |
| 6 | 1 | 513 | 0.38 |
| 7 | 2 | 672 | 0.57 |
| 8 | 4 | 283 | 0.36 |
| 9 | 8 | 721 | 1.06 |
| 10 | 9 | 159 | 0.33 |
| 11 | 10 | 394 | 0.54 |
| 12 | 28 | 825 | 0.79 |
| 13 | 35 | 826 | 1.24 |
| 14 | 3 | 404 | 0.39 |

TABLE 4

| Photoconductor No. | Bisazo Compound No. | Vpo (V) | $E_{\frac{1}{2}}$ (lux · sec) |
|---|---|---|---|
| 15 | 25 | 146 | 0.49 |
| 16 | 8 | 135 | 0.48 |
| 17 | 28 | 225 | 0.39 |
| 18 | 35 | 394 | 0.86 |

TABLE 5

| Photoconductor No. | Bisazo Compound No. | Vpo (V) | $E_{\frac{1}{2}}$ (lux · sec) |
|---|---|---|---|
| 19 | 3 | 510 | 0.59 |
| 20 | 35 | 897 | 4.35 |
| 21 | 11 | 795 | 1.32 |
| 22 | 12 | 386 | 1.20 |
| 23 | 13 | 357 | 0.70 |
| 24 | 14 | 889 | 7.10 |
| 25 | 15 | 214 | 1.92 |
| 26 | 25 | 1129 | 1.34 |
| 27 | 1 | 905 | 0.73 |
| 28 | 2 | 917 | 1.01 |
| 29 | 4 | 340 | 0.44 |
| 30 | 8 | 841 | 1.98 |
| 31 | 9 | 202 | 0.50 |
| 32 | 10 | 660 | 1.58 |
| 33 | 28 | 924 | 1.73 |

TABLE 6

| Photoconductor No. | Bisazo Compound No. | Vpo (V) | $E_{\frac{1}{2}}$ (lux · sec) |
|---|---|---|---|
| 34 | 11 | 1130 | 2.16 |
| 35 | 12 | 1078 | 3.13 |
| 36 | 13 | 974 | 2.08 |
| 37 | 14 | 1137 | 8.20 |
| 38 | 15 | 868 | 3.64 |
| 39 | 22 | 633 | 1.47 |
| 40 | 25 | 1282 | 2.39 |

TABLE 6-continued

| Photoconductor No. | Bisazo Compound No. | Vpo (V) | $E_{\frac{1}{2}}$ (lux · sec) |
|---|---|---|---|
| 41 | 1 | 1117 | 1.43 |
| 42 | 2 | 1162 | 2.19 |
| 43 | 4 | 505 | 1.11 |
| 44 | 8 | 1039 | 4.50 |
| 45 | 9 | 753 | 1.16 |
| 46 | 10 | 842 | 3.93 |
| 47 | 28 | 1109 | 3.35 |
| 48 | 35 | 913 | 8.73 |
| 49 | 3 | 725 | 1.36 |

As can be seen from the results shown in Tables 3, 4, 5 and 6, the electrophotographic photoconductors according to the present invention exhibit high photosensitivity in visible light range. In addition, the photoconductors according to the present invention can be easily manufactured.

The electrophotographic photoconductor No. 12 according to the present invention was incorporated in a commercially available electrophotographic copying machine (Trademark "Model FT-4700" made by Ricoh Company Ltd.) to repeatedly yield images on 10,000 sheets of paper. As a result, there was no deterioration in the photoconductor in the repeated copying operation, so that clear images were obtained. The electrophotographic photoconductor according to the present invention is proved to be excellent in its durability.

What is claimed is:

1. A bisazo compound having formula (II):

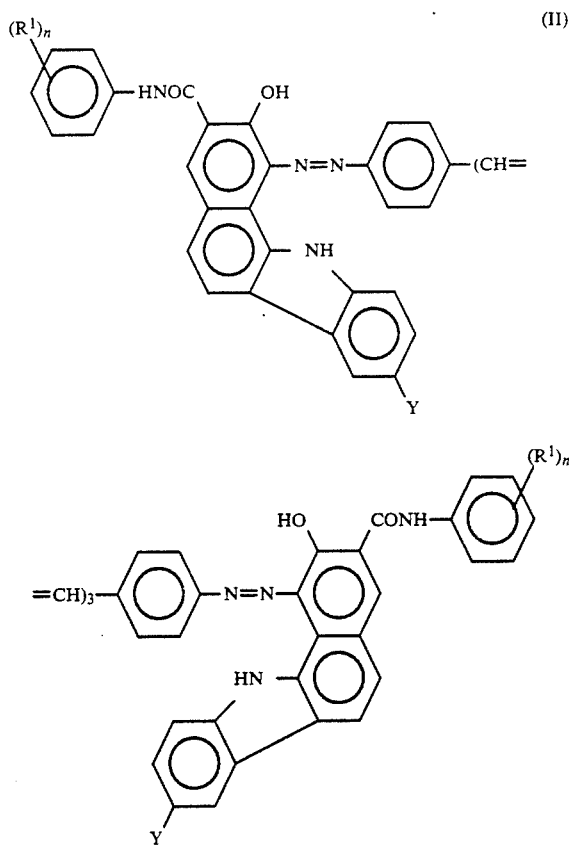

wherein Y represents chlorine, methyl, or methoxy; $R^1$ represents hydrogen, alkyl having 1 to 4 carbon atoms, alkoxyl having 1 to 4 carbon atoms, halogen or nitro;

and n is 1 or 2, and when n is 2, $R^1$ is the same or different.
2. The bisazo compound as claimed in claim 1, wherein said compound is selected from the group consisting of:
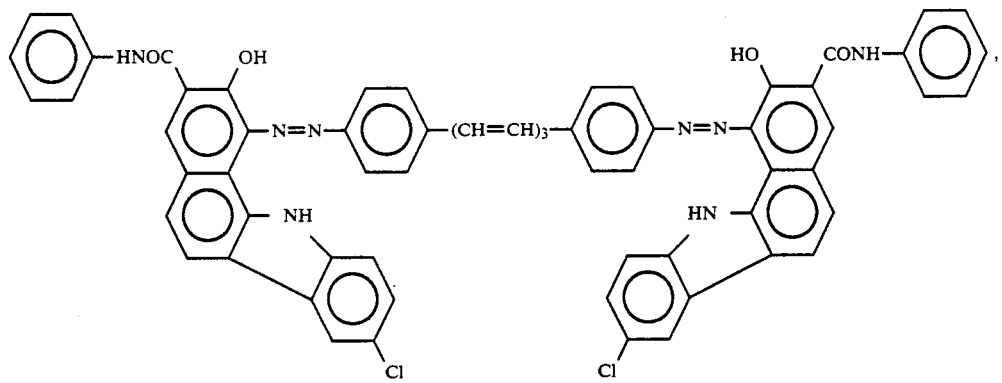
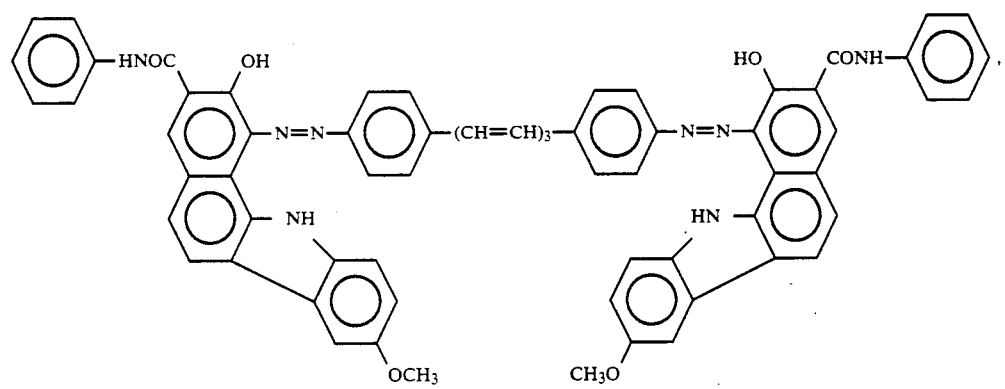
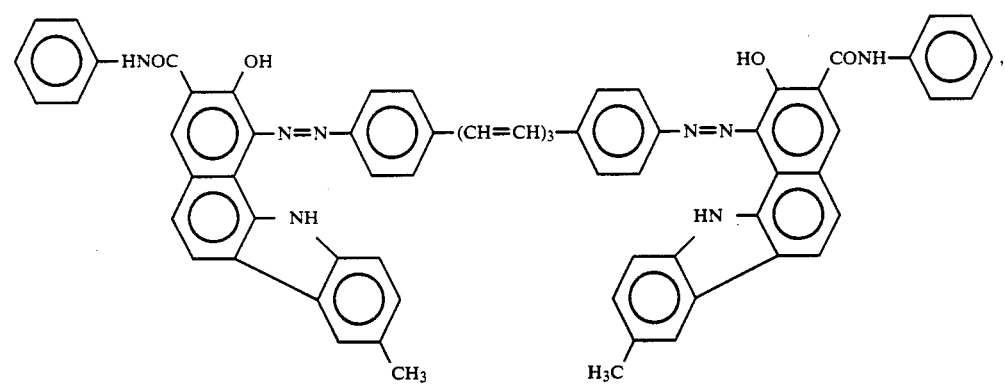
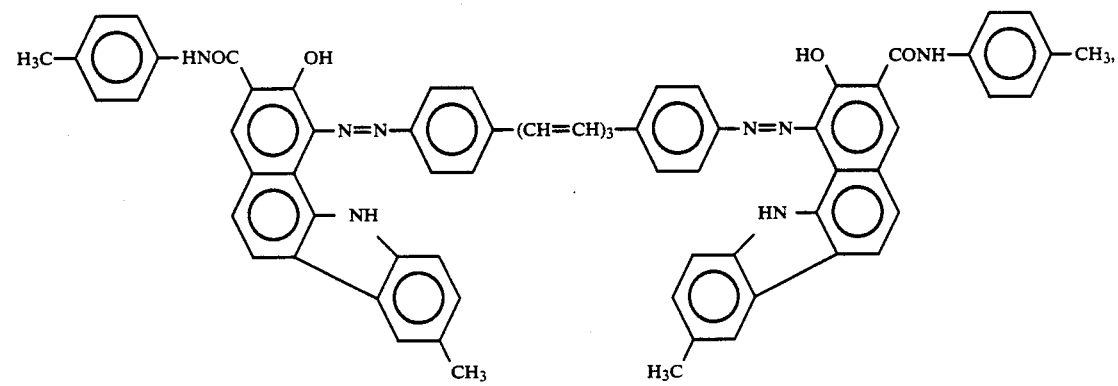

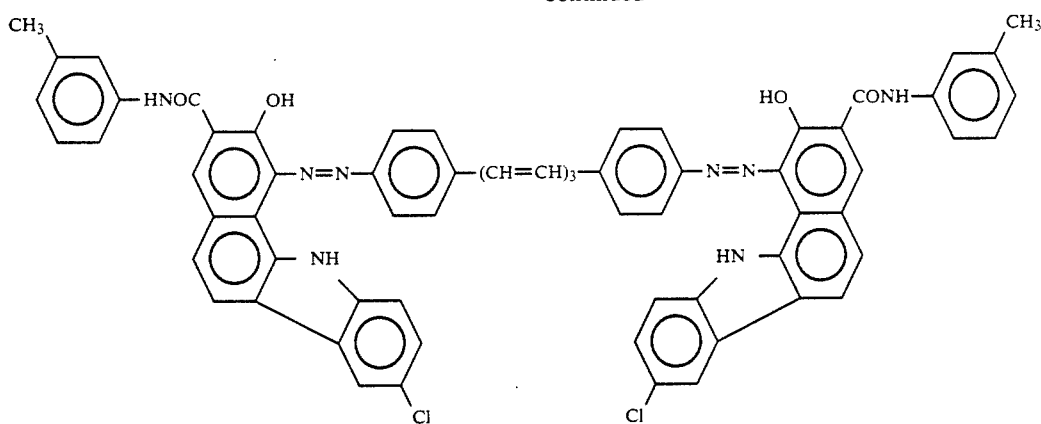
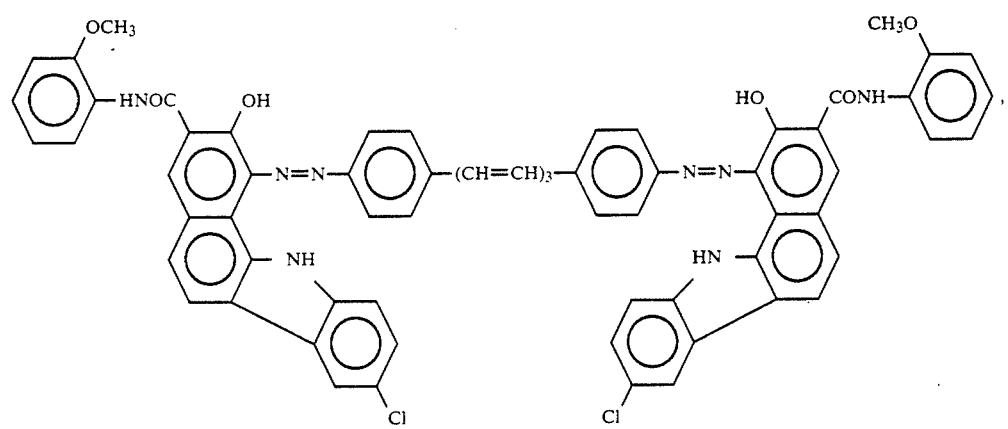
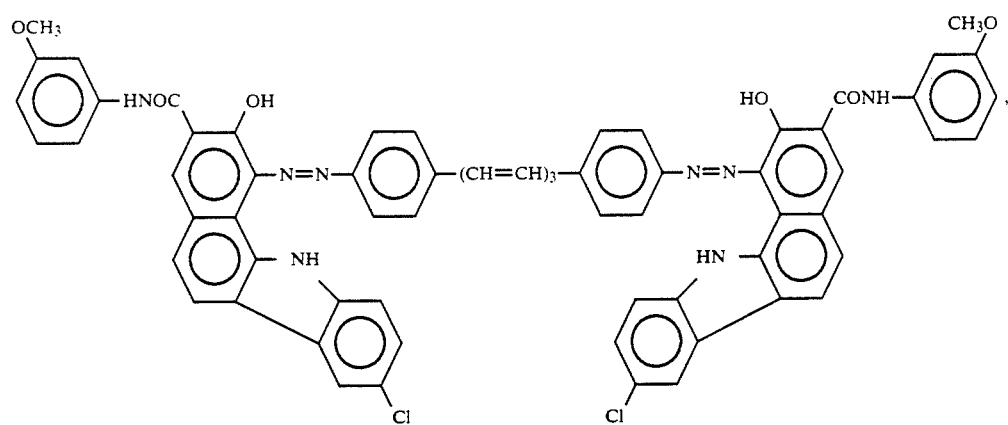
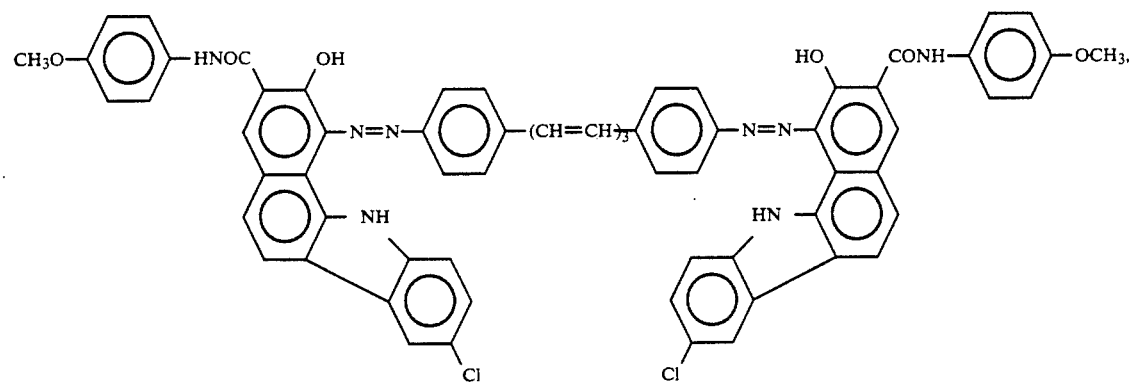

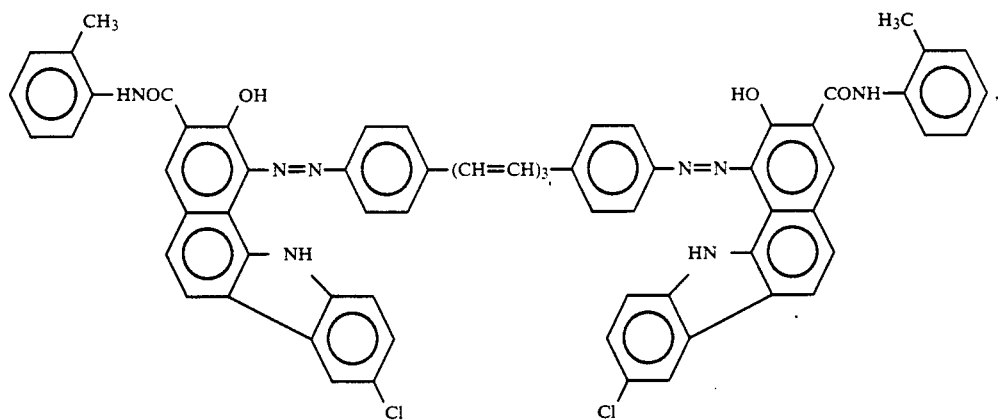
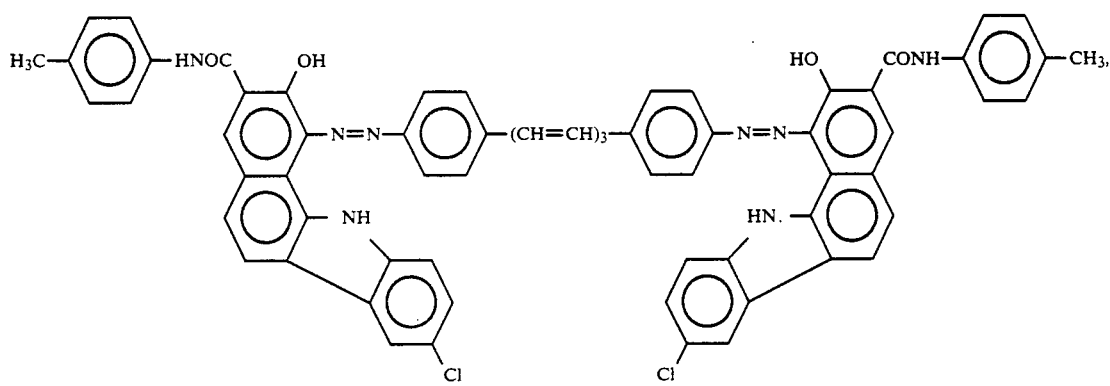
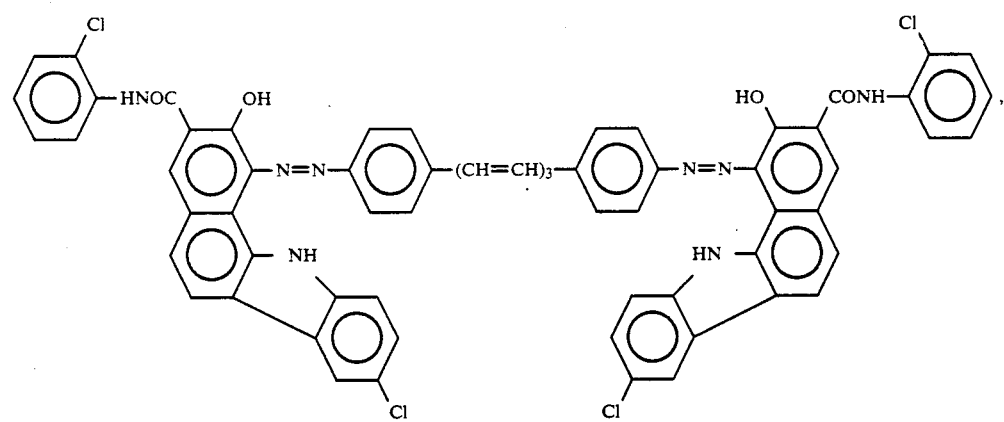
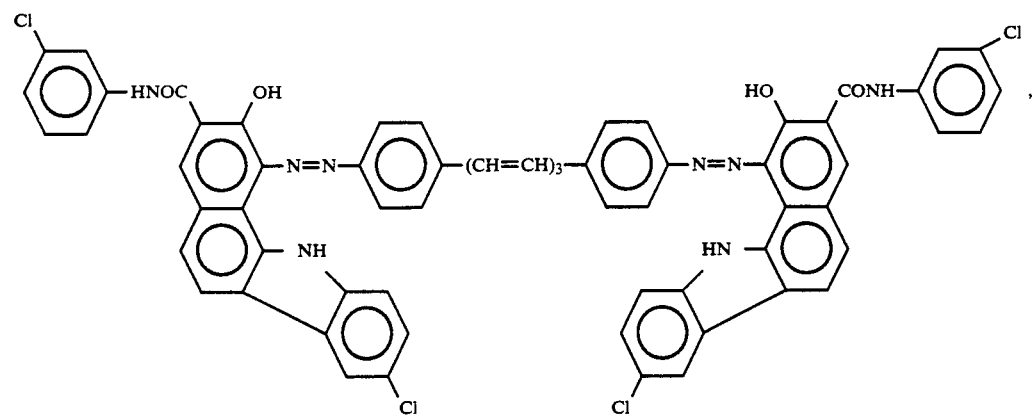

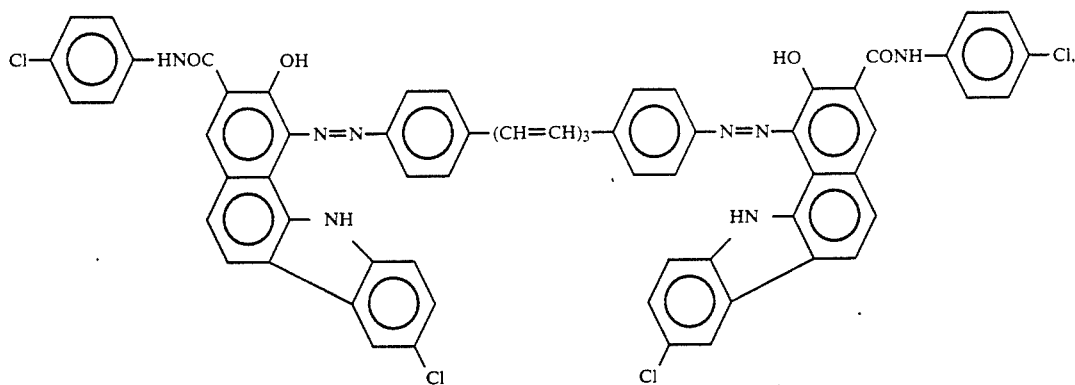
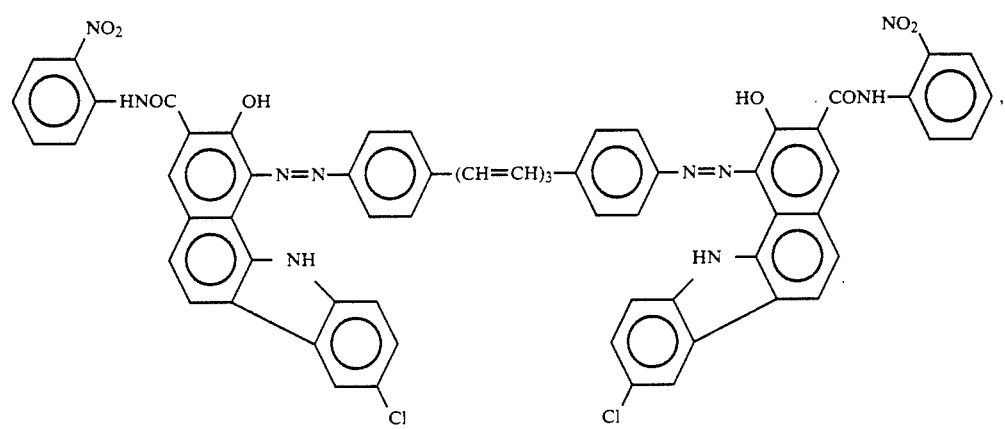
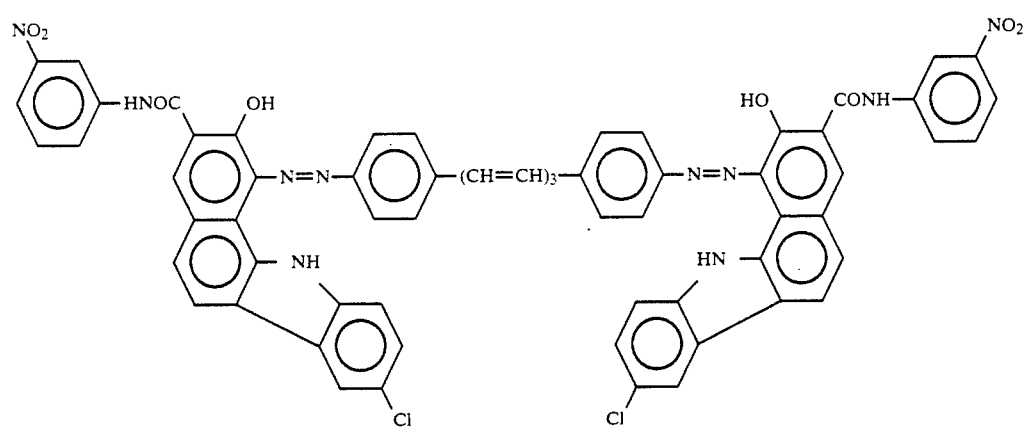
and
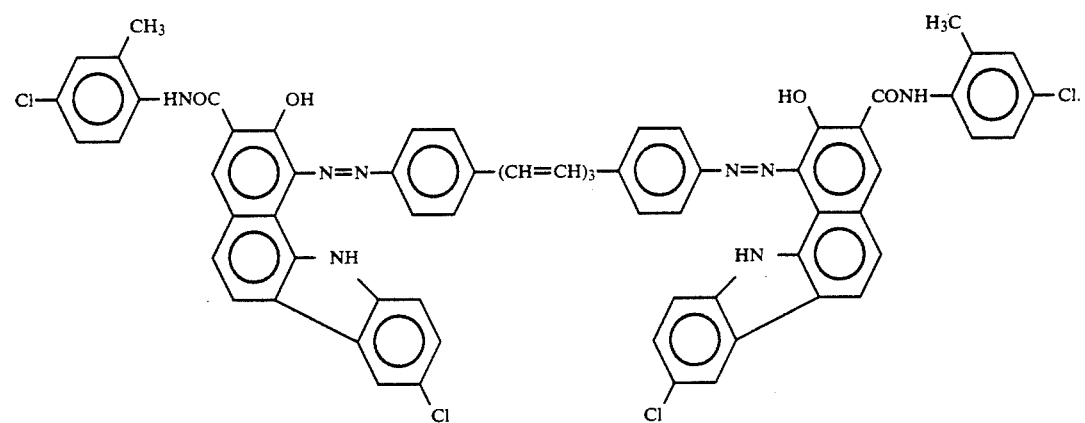
* * * * *

UNITED STATES PATENT AND TRADEMARK OFFICE
CERTIFICATE OF CORRECTION

PATENT NO. : 5,097,022
DATED : March 17, 1992
INVENTOR(S) : Sasaki, et. al.

It is certified that error appears in the above-indentified patent and that said Letters Patent is hereby corrected as shown below:

Column 2, line 13, "Chlorodiane Blue" should read

--Chloro Diane Blue--.

Column 2, line 42, "Chlorodiane blue" should read

--Chloro Diane Blue--.

Column 3, line 55 "which works as" should read --which work as--.

Column 21, line 38 "$BF_4\ominus$ preferable" should read

--$BF_4\ominus$ is preferable--.

Column 34, line 56, "Examples 1 was" should read

--Example 1 was--.

Signed and Sealed this

Seventh Day of September, 1993

Attest:

BRUCE LEHMAN

Attesting Officer     Commissioner of Patents and Trademarks